US012703015B2

(12) United States Patent
Schroeder

(10) Patent No.: US 12,703,015 B2
(45) Date of Patent: Aug. 11, 2026

(54) ZONAL CLEANING SYSTEM FOR TRANSPORT CONTAINERS

(71) Applicant: HOPPER BLASTER IP HOLDINGS, LLC, Brooten, MN (US)

(72) Inventor: Thomas Dale Schroeder, Brooten, MN (US)

(73) Assignee: HOPPER BLASTER IP HOLDINGS, LLC, Brooten, MN (US)

( * ) Notice: Subject to any disclaimer, the term of this patent is extended or adjusted under 35 U.S.C. 154(b) by 785 days.

(21) Appl. No.: 17/561,223

(22) Filed: Dec. 23, 2021

(65) Prior Publication Data

US 2022/0203940 A1 Jun. 30, 2022

Related U.S. Application Data

(60) Provisional application No. 63/130,681, filed on Dec. 26, 2020.

(51) Int. Cl.

| | |
|---|---|
| ***B08B 5/02*** | (2006.01) |
| ***B08B 9/093*** | (2006.01) |
| ***B60R 16/08*** | (2006.01) |
| ***B60S 1/64*** | (2006.01) |
| ***B65D 90/00*** | (2006.01) |

(52) U.S. Cl.

CPC ................ *B08B 5/02* (2013.01); *B08B 9/093* (2013.01); *B60R 16/08* (2013.01); *B65D 90/0093* (2013.01); *B08B 2209/08* (2013.01); *B60S 1/64* (2013.01)

(58) Field of Classification Search

None

See application file for complete search history.

(56) References Cited

U.S. PATENT DOCUMENTS

| | | | | |
|---|---|---|---|---|
| 4,325,495 | A | 4/1982 | Mokris | |
| 5,594,973 | A | 1/1997 | Brusseleers et al. | |
| 11,059,664 | B1 | 7/2021 | Schroeder | |
| 2002/0029792 | A1 | 3/2002 | Carmi et al. | |
| 2009/0211605 | A1 * | 8/2009 | Ahmad | B60S 1/528 134/123 |
| 2015/0020343 | A1 * | 1/2015 | Shibata | B05B 15/68 15/306.1 |
| 2016/0089701 | A1 | 3/2016 | Kosuda et al. | |

* cited by examiner

*Primary Examiner* — Levon J Shahinian

(74) *Attorney, Agent, or Firm* — Steven M. Koehler; Westman, Champlin & Koehler, P.A.

(57) ABSTRACT

A zonal cleaning system for a hopper trailer. The zonal cleaning system includes a controlled air supply that has air tanks with outlet valves operating sequentially and cyclically for a predetermined amount of time. Upper rail assemblies are positioned relatively about and mounted to the upper portion of the sidewalls and each connects to one of the outlet valves. The upper rail assemblies have nozzles directionally oriented and the sidewall rail assemblies each have a fluid delivery line connecting to one of the outlet valves. One or more drop-down segments connects to the fluid delivery line, and each of the drop-down segments has a nozzle manifold with one or more nozzles. Activation of the controlled air supply expels air sequentially and cyclically through each of the upper rail assemblies and each of the sidewall rail assemblies.

21 Claims, 30 Drawing Sheets

Tractor Air Compressor
184
196
196a
B 200a
200
198
External Air Compressor
C
202

38a
32a
38
36
32
A
36a
34
36
32
32b
40
14
A 58
40
36
14
52
54
22a
42
16
52a
32a
170
154
20a
28
124
24a
30
24

7
7
30
124
28
122
46
16
22

58a
100
102
106c
108
98
110
106
58
60
58b 66a
66
58a
110
100
102
98
60
58b
58c 66a
66
66b 52
114

114b
118
114d
32
112
52
114b
114a
120a
120

118a
118

ZONAL CLEANING SYSTEM FOR TRANSPORT CONTAINERS

BACKGROUND

The present invention is generally directed to a zonal cleaning system for transport containers that effects to initiate flow and dispense material from the container. More particularly, the cleaning system utilizes a fluid such as air or water conveyed by way of multiple rail assemblies that incorporate strategic placement of nozzles to effect systemic removal of residual, adhering material generally present on wall and incline surfaces, along corners and crevices formed by adjoining walls and incline surfaces, and like structural features set forth within the transport container.

Commodities in form of foodstuff such as grain, corn, meal, distiller's dried grain (DDG), and the like or fertilizers such as potash are commonly contained within large containers and transported in bulk by rail assembly and semi-trailer trucks. As associated with most granular forms of material, there is tendency for the material to shift and compact tightly within the confines of the container during transit. The extent of material compactness can depend on several factors, such as the type and physical properties of the transported material, time in transit, weather, humidity levels, influential forces from bumps and jarring encountered during transit, and so forth. In most common scenarios, at the time for dispensing the transported material from the container, generally through an operable chute incorporated as part of the transport container's structure, one will often observe occurrences of significant buildup or bridging at and around the opening of the chute and adherence of residual material relatively about wall and incline surfaces, at and along crevices formed by adjoining walls, and like structural features within the container. As a result of this unfortunate occurrence, one must apply a sufficient force to the adhering material to effect complete removal from the container so that one may deliver a full load of material and/or prevent cross contamination with differing or incompatible types of material necessitating subsequent transport. Although recognizable advancements have been made in the art to effect localized flow of containerized materials for dispensing through the chute, they are generally ineffectual for systemic removal of adhering materials from within the container and, in some instance, can further structural damage to the container if care is not properly taken.

One such approach taken in the art involves simply using a hand probe or stick of extended length and manually prodding the material until there some visual occurrence of breaking up the bridging and adhering material most prominently established in and around the chute and corners of the container. Accompanying prodding of the material, the attendant may strike or apply hand force against the planar sides and bottom areas of the trailer to further initiate movement of the adhering material clinging to planar surface elements of the trailer. Of course, this combined approach necessitates or requires an attendant or operator to climb relatively about and atop the container to attain a visual vantage of the adhering material so that one may succeed in initiating movement of the material for ultimate dispensing through the chute. Although possibly effective for its intended purpose, it may introduce safety concerns to the operator in and around the container, particularly in occurrences of inclement weather and other harsh conditions during the material unloading process.

Another approach, albeit more elaborate than hand prodding, utilizes vibration technology, particularly in the form of a motorized vibrating plate that temporally mounts to an outer sidewall of the transport container, and that upon power activation, purposefully effects to vibrate the sidewall at a predetermined frequency, presumably at a level sufficiently capable to commence movement of the material within the container while inhibiting deleterious impact to the structural integrity of the container. Although effective for this limited purpose, some materials may still reside with the container and even more problematic, may require repeated mounting of the motorized vibrating plate from location to location within the container to advance complete removal of the residual material, albeit to a varying degree. Like the hand prodding approach, use of vibration technology still requires visual inspection of the material possibly residing within the container to identify problematic areas and confirm complete removal thereof from the container, thus introducing once again safety concerns to the operator during the material unloading process.

In yet a more elaborate approach for removing materials, a pneumatic-based system may be employed at the point of unloading material from the container, whereby a moveable arm equipped with a hose and nozzle assembly may supply air at a moderate force that is guided toward and directed to problematic areas, some of which being automated by means of computer control. Although effective for their intended applications, the more elaborate type of systems tends to be localized or stationary at the material unloading station, complex, and costly to manage and operate over the long term.

While these approaches fulfill to break up adhering material types and possibly commence localized flow within certain areas of the transport container and ultimately through the integrated chute, they inherently fall short in addressing safety concerns and minimizing costs associated with dispensing materials from the container.

SUMMARY

It is an object of the present invention to provide a zonal cleaning system for systemic removal of material generally carried and transported in containers such to eliminate cross contamination of the varying types of material necessitating bulk transport, such as potash fertilizer, crop seeds, meal, grain, beans, and so forth.

Still another object of the present invention is to provide a zonal cleaning system that eliminates the need to access an interior portion of a transport container such to fulfill safety to those whom are involved in dispensing materials from the container.

Still yet another object of the present invention is to provide a zonal cleaning system that effects efficient clean out of varying types of containers integrally incorporating a chute for passage of materials therethrough, such as those that are categorically transported by semi-trailer trucks, rail assembly, and so forth.

Still yet another object of the present invention is to provide a zonal cleaning system that utilizes an onboard air compressor and air delivery system generally associated with a brake system of a tractor or semi-truck suited for hauling a transport container.

Still another object of the present invention is to provide a zonal cleaning system that offers cycled cleaning of the transport container to further advance removal of 10 residual, adhering material that may otherwise reside within the container and cross contaminate with other transported material.

Even still another object of the present invention is to provide a zonal cleaning system that mitigates occurrences of serious injury to attendants or operators by eliminating the need to gain access to an interior portion of a container to visually identify problematic areas and effect removal of residual, adhering material from the transport container.

Still yet another object of the present invention is to provide a zonal cleaning system that possesses manual and automated control for precise and direct application of force to problematic areas, generally in the nature of adhering material along walls and crevices formed by adjoining walls associated a transport container's overall structure.

It is yet another object of the present invention is to provide a zonal cleaning system that facilitates use of air or a mixture of air and a fluid to remove residual material for consummate interior cleaning of a transport container that eliminates concerns of cross contamination of transported materials.

In accordance with the present invention a zonal cleaning system has been devised for use with varied forms of transport containers typically having incline bottom surfaces converging to form a chute for dispensing transported material therethrough, the zonal cleaning system in particular including a controlled air supply connecting to inlet ends of a pair of upper rail assemblies, one or more end wall rail assemblies, a plurality of sidewall rail assemblies, and an overhead rail assembly that generally extend into and exist interiorly within the confines of the transport container, the controlled air supply having at least two air tanks each configured with outlet valves that operate sequentially and cyclically to forcibly release air or a liquid into each of the rail assemblies and outwardly through a plurality of nozzles associated therewith and directionally orientated to forcibly interact with the adhering material relatively present about the wall surfaces of the transport container and initiate its movement and flow toward the chute for dispensing therethrough, the controlled air supply further includes options for effecting manual and automated modes of operation, respectively consisting of a manual switch panel configured with momentary push buttons designated for each of the outlet valves and a processor board configured with an onboard microcontroller and memory modules for storing an instruction set capable of effecting controlled activation of the outlet valves by way of wireless communications between a communicative device, generally in the form of a 15 smartphone, and the microcontroller.

Other objects, features, and advantages of the present invention will become apparent in the following detailed description of the preferred embodiments thereof when read in conjunction with the accompanying drawings in which like reference numerals depict the same parts in the various views.

Figure 1:
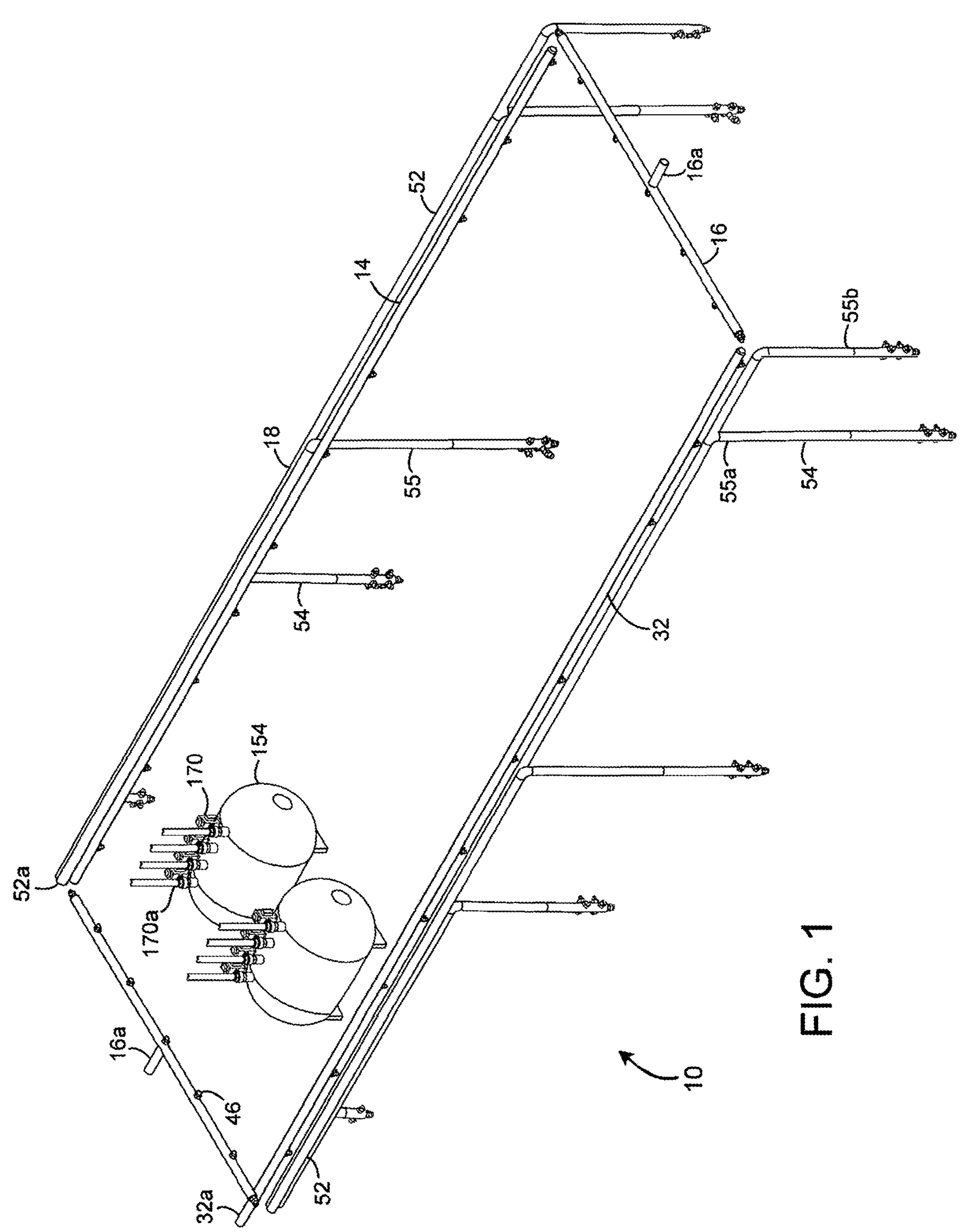
FIG. 1 is a top perspective view of the preferred embodiment of the present invention illustrating a pair of air tanks equipped with outlet valves suited for connection to inlet ends of a plurality of sidewall rail assemblies each comprising one or more drop-down segments, a pair of upper rail assemblies, and a pair of end wall rail assemblies.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION

While this invention is susceptible of being embodied in many different forms, the preferred embodiment of the invention is illustrated in the accompanying drawings and described in detail hereinafter with the understanding that the present disclosure purposefully exemplifies the principles of the present invention and is not intended to unduly limit the invention to the embodiments illustrated and presented herein. The present invention has particular utility as a zonal cleaning system that structurally adapts to a transport container incorporating a chute and is particularly suited to initiate zonal movement and release of adhering and bridging material observably present within the interior confines of the transport container for ultimate dispensing through the chute.

Referring now to FIGS. 1, 2, 2A, 2B, and 2C there is shown generally at 10 a zonal cleaning system comprising a controlled air supply 12 adaptably connecting to a pair of upper rail assemblies 14, one or more end wall rail assemblies 16, and a plurality of sidewall rail assemblies 18 that extend into and exist interiorly within the confines of a transport container or hopper trail 20 adaptively suited for bulk transport of commodities and the like. The hopper trail, as particularly shown in FIGS. 3 and 4, is of the type commonly known in the art to include one or more loading hoppers 22 with each having a pair of sidewalls 24 integrally joining to a pair of end walls 26 to form a box-like structure, whereby bottom leading edges **24*a*, 26*a* of the sidewalls and end walls terminate at and connect to incline bottom surfaces 28 that substantially converge to form an open chute 30 for dispensing trailer-transported material therethrough. It is understood within the context of this disclosure that the hopper trailer 20** as described herein for illustrative purposes may operably exist or might be associated with a tractor or semi-trailer truck, a rail car, or other modes of transport.

Figures 5, 6:
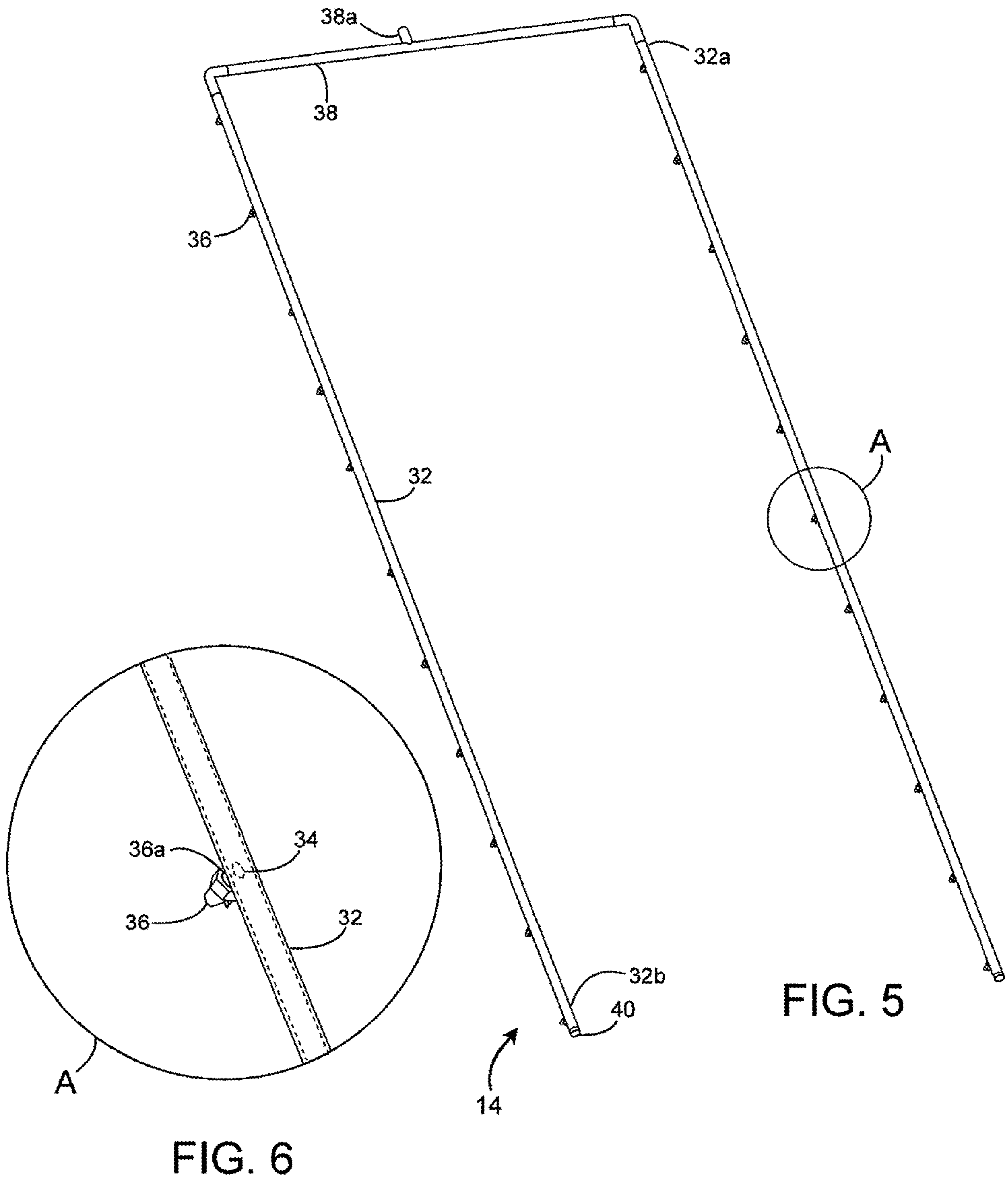
FIG. 5 is a top perspective view of the preferred embodiment of the present invention illustrating an upper rail assembly having a plurality of threaded bores for threadably accepting an equal number of nozzles.
FIG. 6 is an enlarged perspective view of the preferred embodiment of the present invention illustrating a lengthened section of pipe of an upper rail assembly and having a nozzle fitted within a threaded bore.
Figures 7, 8:
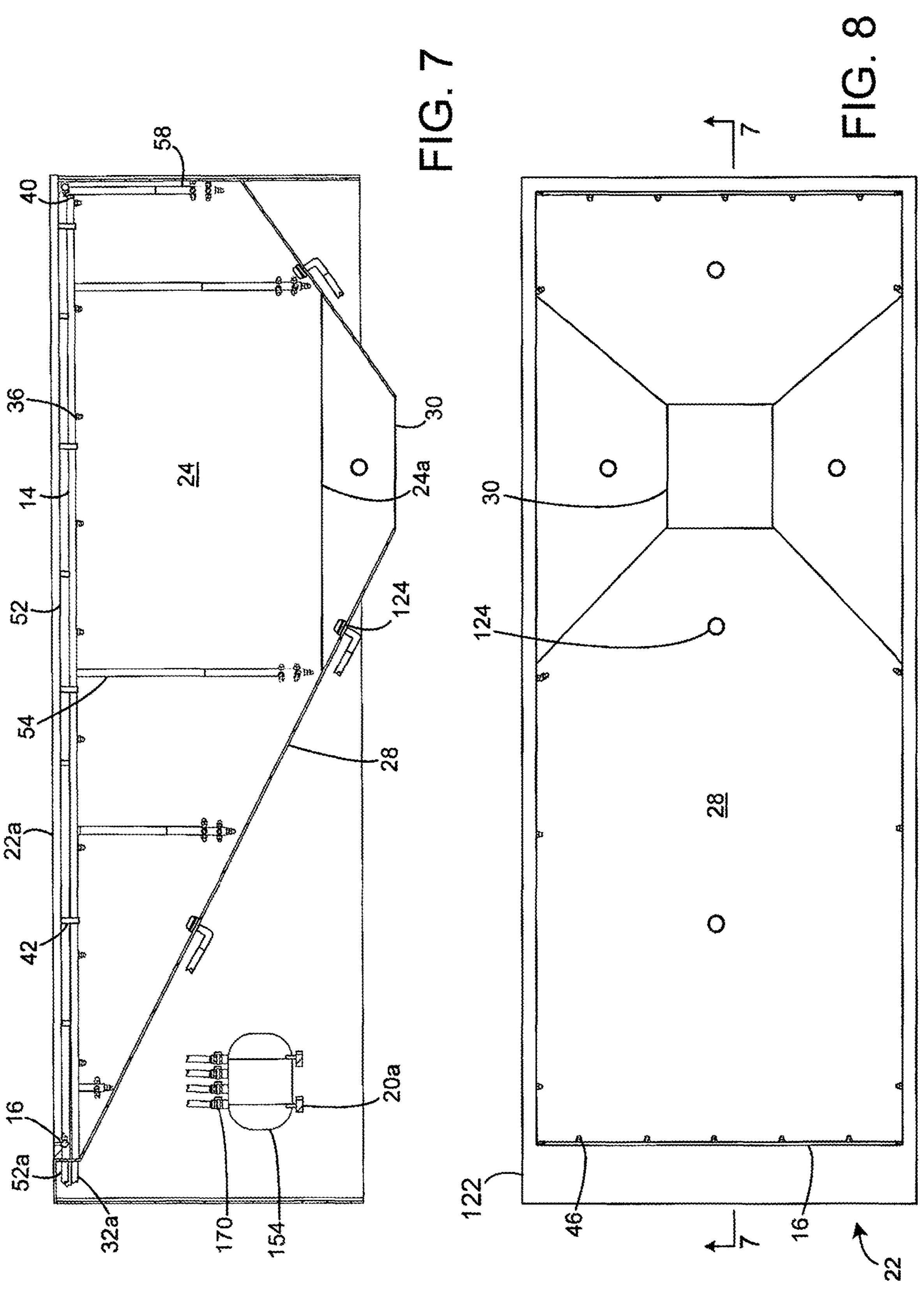
FIG. 7 is a cross sectional view of the preferred embodiment of the present invention taken along lines 7-7 in FIG. 8 illustrating an air tank, an upper rail assembly, and a plurality of sidewall rail assemblies each configured with drop-down segments.
FIG. 8 is a top plan view of the preferred embodiment of the present invention illustrating a hopper of a dual-hopper trailer and having incline bottom surfaces converging to form a chute.

Now in reference to FIGS. 5 and 6, each upper rail assembly 14, generally consisting of a lengthened section of pipe 32, comprises a plurality of threaded bores 34 equally spaced thereabout for accommodating placement and attachment of an equal number of nozzles 36, whereby each nozzle comprises a threaded body **36*a* for threadably engaging the threaded bore and is directionally orientated downward and angularly inward a predetermined amount such to interact with the trailer's sidewall 24 to assistively effect removal of adhering material therefrom. Each upper rail assembly may exist to extend alongside and mount to an upper portion 22*a* of the hopper 22 and includes an inlet end 32*a* for connecting to the controlled air supply 12. Alternatively, the inlet end of each of the upper rail assemblies may be communicatively joined by an end section of pipe 38 that accommodates a common inlet 38*a* for connecting to the controlled air supply 12, whereby air is forced into the common inlet such to dividably enter into each of the upper rail assemblies and ultimately through each of the nozzles 36 for even distribution of air along the sidewalls. Regardless of the configuration, a terminal end portion 32*b* of each of the lengthened sections of pipe of the upper rail assembly is adaptively fitted with an end cap 40 that fulfills to eliminates outflow therefrom such to force the air to primarily pass and exit through each of the downwardly-positioned nozzles. FIG. 7 illustrates mounting of each of the upper rail assemblies 14 to the upper portion 22*a* of the trailer by multiple supporting straps 42** relatively placed and secured along the lengthened section of pipe to inhibit movement thereof during moments of loading material into the trailer's hopper, for example, with each of the straps having ends affixed to the trailer's sidewall or an equivalent structural feature of the trailer by a fastener of the type appropriate for such use, including rivets, screws, bolts, etc.

Figure 9:
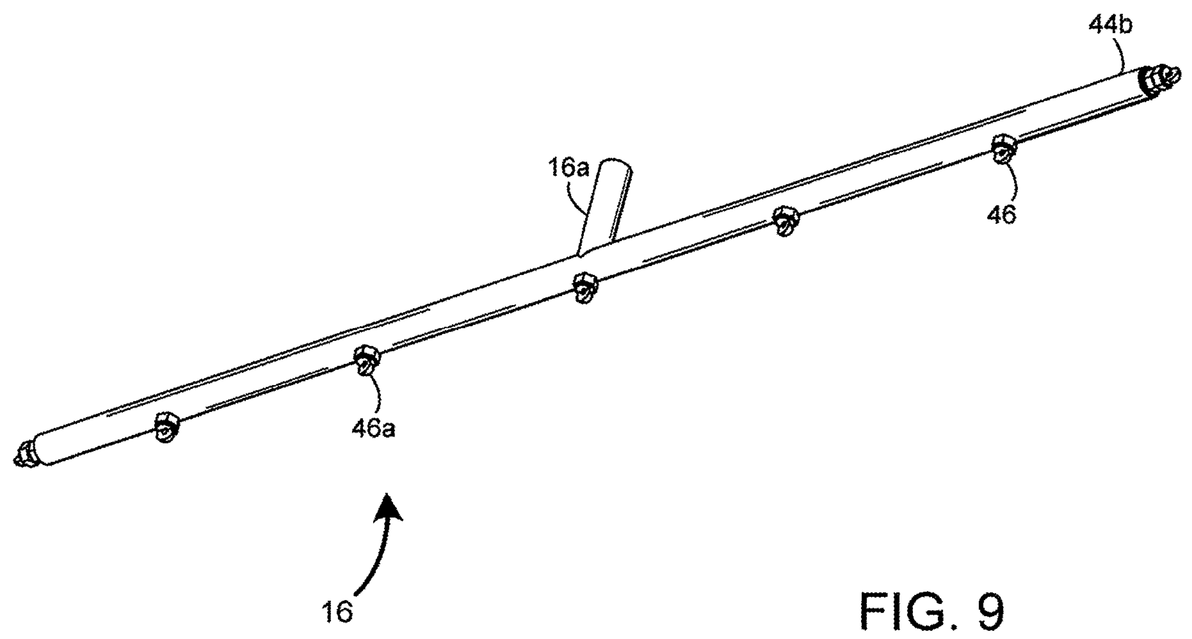
FIG. 9 is a top perspective view of the preferred embodiment of the present invention illustrating an end wall rail assembly having a lengthened section of pipe configured with a plurality of threaded bores for threadably attaching an equal number of nozzles.
Figure 10:
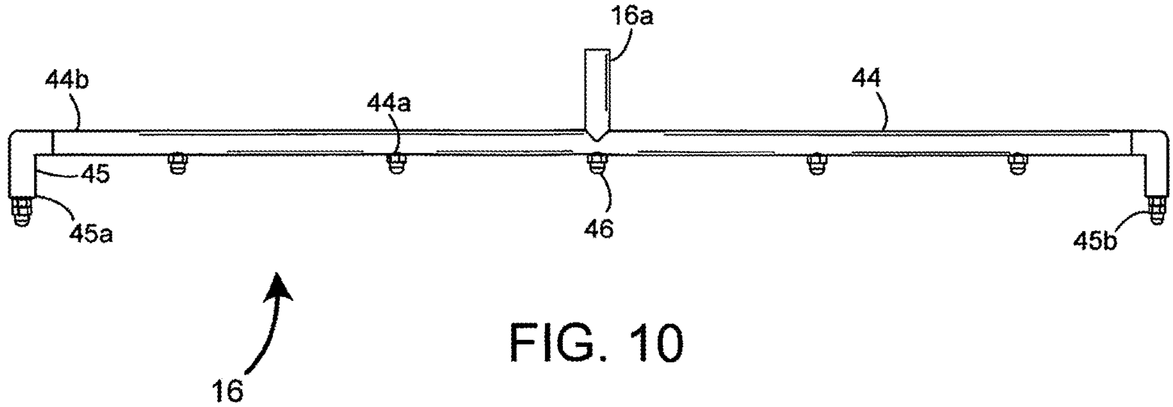
FIG. 10 is a top plan view of the preferred embodiment of the present invention illustrating an end wall rail assembly having an inlet and ends each configured with an inward extension.

Similarly, each end rail assembly 16, as mounted to the hopper's end walls as in FIG. 8, comprises a lengthened section of pipe 44 configured with a plurality of threaded bores **44*a* for accommodating within each a nozzle 46, generally being spaced evenly apart from one another relatively about the lengthened section of pipe, as shown in FIGS. 9 and 10. To effect consummate removal of material that may exist and adhere relatively about the incline bottom surface 28, the nozzles are positioned and angularly oriented to substantially coincide with the pitch of the incline bottom surface 28, particularly in such manner to allow a predetermined amount air flow to reflectively engage with the incline bottom surface and forcibly interact with the adhering material to initiate zonal movement for eventual dispensing through the chute 30. In an alternative configuration, as shown in FIG. 10, the end rail assembly may supplementally comprise a pair of inward extensions 45 each attaching to ends 44*b* of the lengthened section of pipe 44 to fulfill further reach inwardly within the hopper to angularly coincide with the incline bottom surface. An end 45*a* of each of the inward extensions includes a nozzle 45***b* to the likes used for other assemblies set forth herein.

Figure 11:
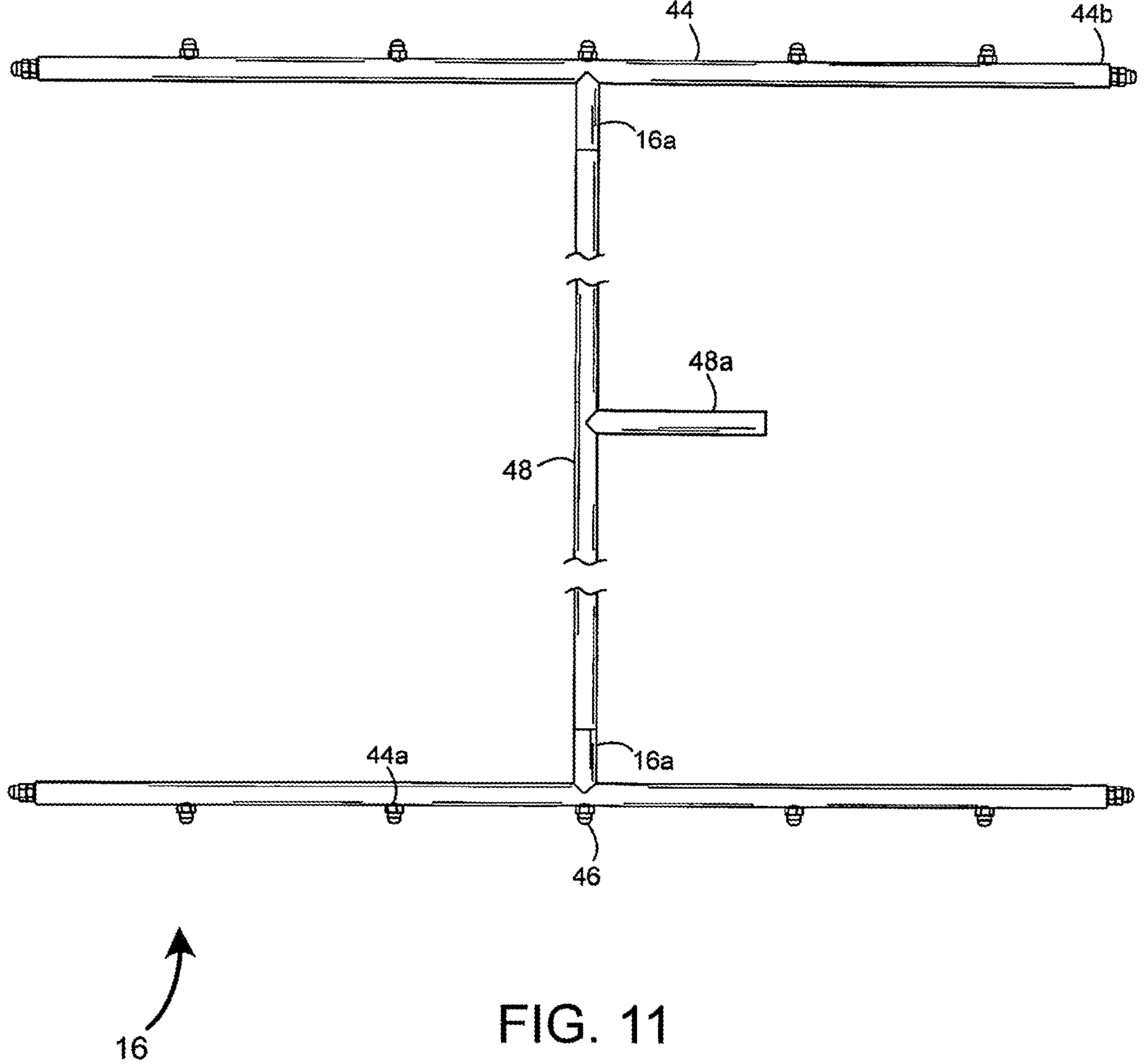
FIG. 11 is a top plan view of the preferred embodiment of the present invention illustrating a pair of end wall rail assemblies connecting to a section of pipe having a common inlet.

Like the upper rail assembly, the end rail assembly 16 may operably exist independent from one another, whereby an inlet end 16*a* thereof connects directly to the controlled air supply 12 to fulfill enhanced air flow across the incline bottom surface that can forcibly interact with and remove material exhibiting unusual adhering characteristics. Like the upper rail assembly, a pair of end rail assemblies 16 may connect together by a section of pipe 48 that incorporates a common inlet 48*a* for connecting to the controlled air supply such that the air flow divides equally between the end rail assemblies and dispenses evenly through the connected arrangement of nozzles, as typically shown in FIG. 11. Attachment of the end rail assembly to each of the end walls of the trailer may be advanced by multiple supporting straps 42 of the type described for the upper rail assembly 14 using equivalent attachment methodology.

Figure 12:
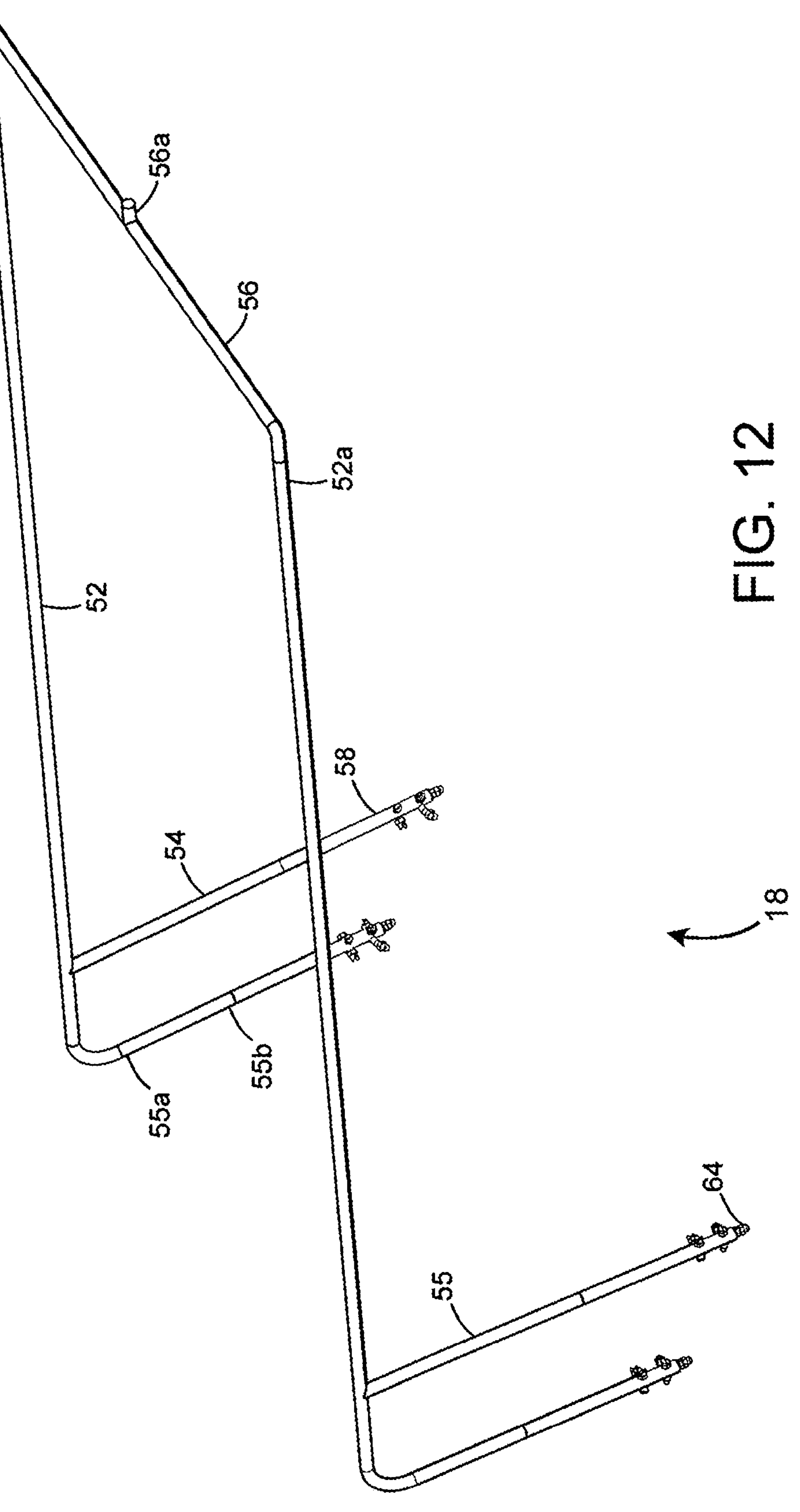
FIG. 12 is a left-side perspective view of the preferred embodiment of the present invention illustrating a pair of sidewall rail assemblies connected together by a section of pipe having a common inlet.
Figures 13, 14:
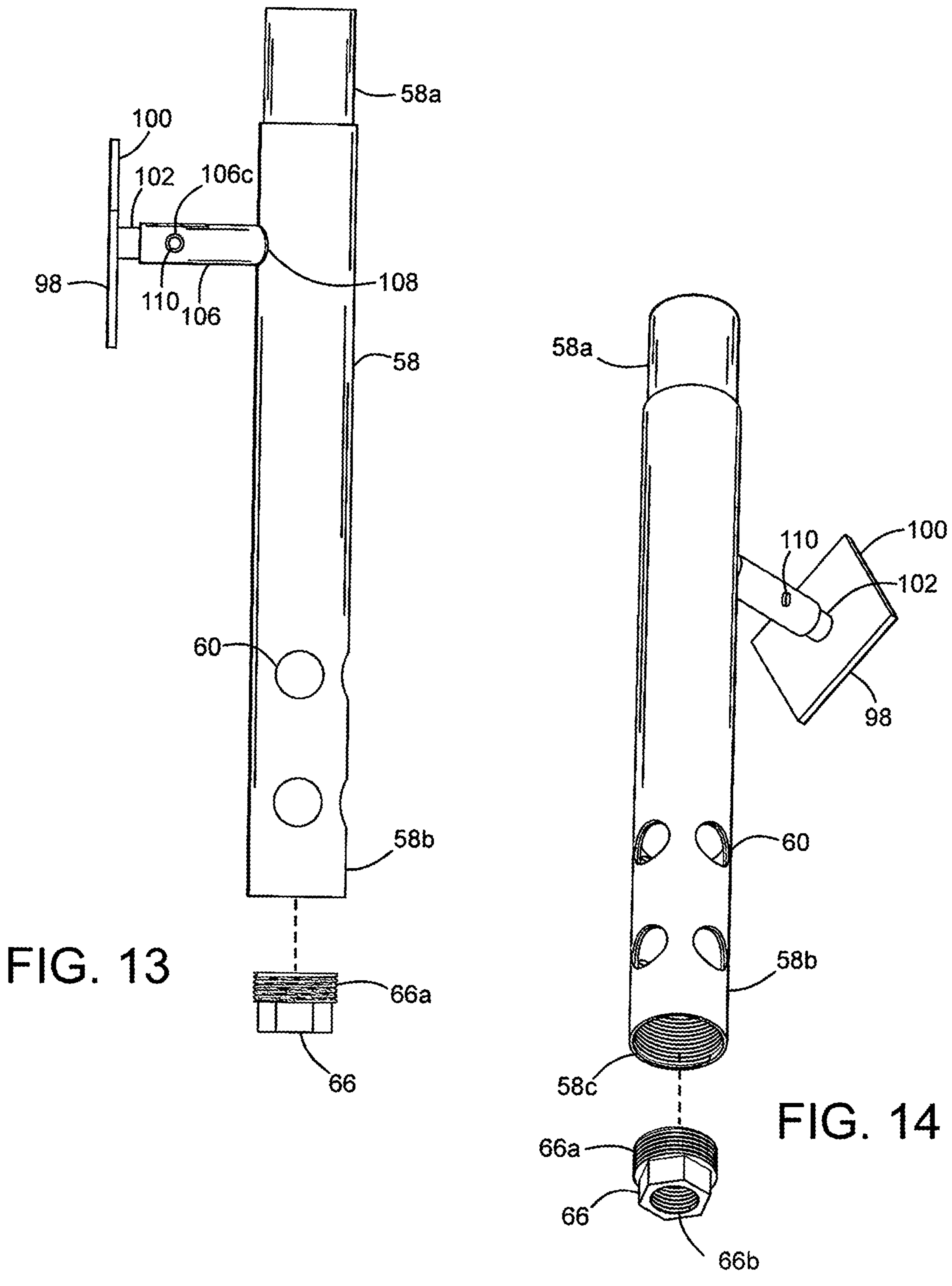
FIG. 13 is a front perspective view of the preferred embodiment of the present invention illustrating a nozzle manifold having a first end configured with a reduced diametric portion and a second end configured with internal threads.
FIG. 14 is a front elevational view of the preferred embodiment of the present invention illustrating a coupling and circumferential row of multiple bores suited for threadably receiving within each a nozzle.

Referring now to FIG. 12, each of the sidewall rail assemblies 18 comprises a fluid delivery line 52 configured with an inlet end 52*a* for connecting to the controlled air supply 12 and one or more drop-down segments 54 connecting to the fluid delivery line and extending downwardly therefrom alongside the sidewall 24 of the hopper to advance reach to the corners and crevices formed by adjoining walls and incline bottom surfaces. Like the upper and end rail assemblies, the fluid delivery lines of the sidewall rail assembly 18 may independently connect to the controlled air supply at its inlet end 52*a* or joined together by a section of pipe 56 having a common inlet 56*a* connecting to the controlled air supply for versatile operation of the zonal cleaning system.

The fluid delivery line 52 is further shown in FIG. 7 to extend lengthwise along the upper portion 22*a* or header of the hopper, generally in proximity of and alongside the upper rail assembly. Each drop-down segment 54 is generally configured with a tubular member 55 having an end 55*a* connecting to the fluid delivery line and a terminal end 55*b* connecting to a nozzle manifold 58 generally of cylindrical form. The nozzle manifold is shown to comprise at least one circumferential row of multiple bores 60 with each being suited to threadably receive a nozzle 62, generally of the similar type employed for use with the aforementioned upper and end rail assemblies. A first end 58*a* of the nozzle manifold generally includes a reduced diametric portion that slidably accepts there over the terminal end of the drop-down segment for establishing a press-fitted connection while offering continuity of appearance. Conversely, a second end 58*b* of the nozzle manifold is shown in FIGS. 13-16 as being configured with internal threads 58*c* for threadably receiving an external threaded end 66*a* of a coupling 66. The coupling further comprises an internal threaded end 66*b* for threadably receiving an end nozzle 64, whereby the nozzle may be directionally orientated in general toward the chute 30 of the hopper 22.

Figures 15, 16:
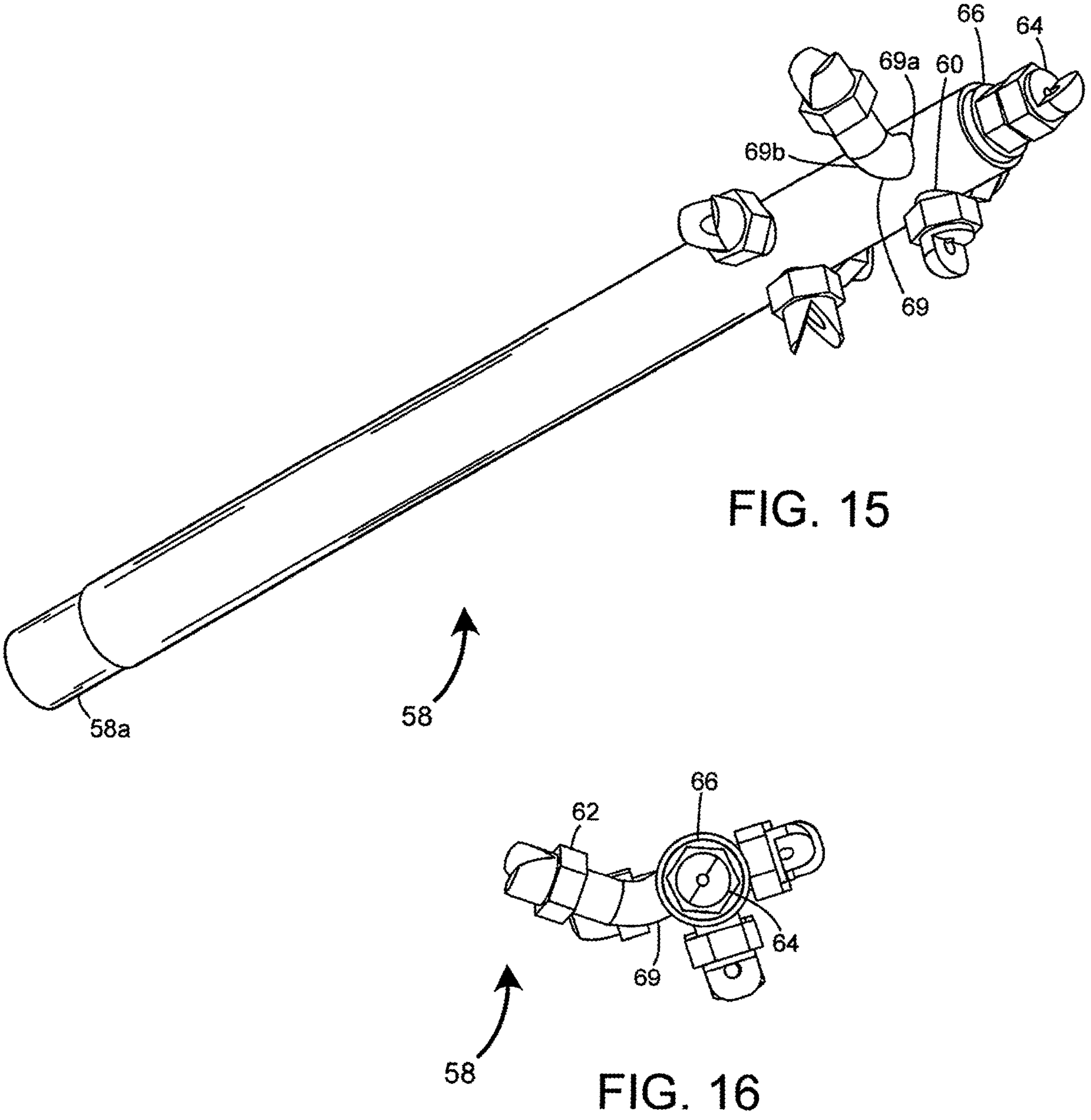
FIG. 15 is a top perspective view of the preferred embodiment of the present invention illustrating a nozzle manifold having a circumferential row of multiple bores for threadably receiving within each a nozzle and a first end configured with a reduced diametric portion.
FIG. 16 is a bottom plan view of the preferred embodiment of the present invention illustrating a nozzle manifold having an angular fitting threadably fitted with a nozzle and a coupling threadably fitted with an end nozzle.
Figure 17:
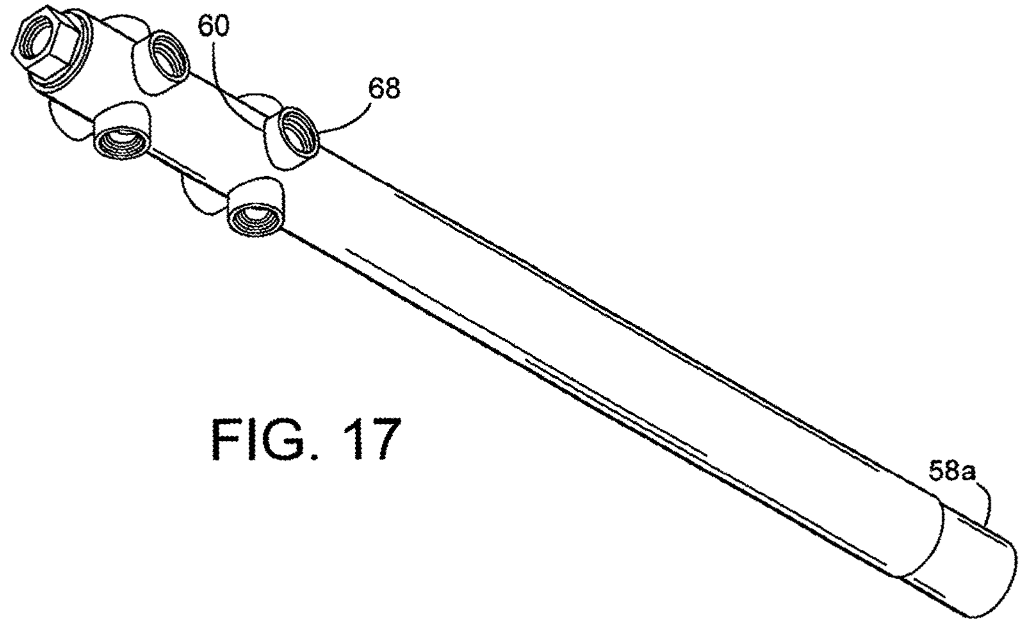
FIG. 17 is a top perspective view of the preferred embodiment of the present invention illustrating a nozzle manifold having a circumferential row of multiple bores suited for attaching thereto an equal number of couplings.
Figure 18:
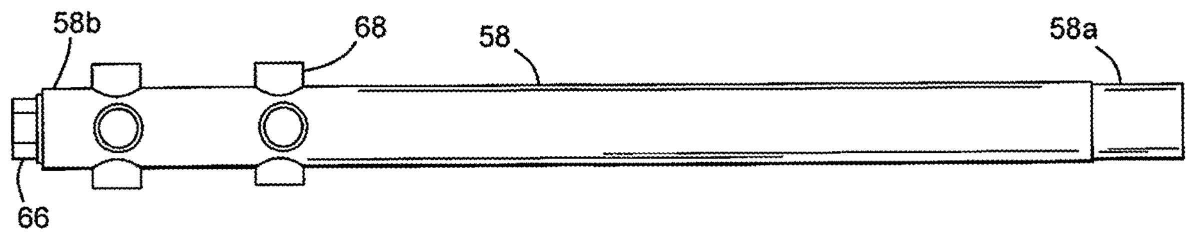
FIG. 18 is a front elevational view of the preferred embodiment of the present invention illustrating a nozzle manifold having a first end configured with a reduced diametric portion and a second end threadably fitted with a coupling.

In lieu of direct threaded attachment of the nozzle as described thus far, a nozzle coupling 68 of the type shown in FIGS. 17 and 18 may be fixedly attached to each of the bores 60, particularly in the instance where the nozzle manifold is manufactured with material stock having a thin wall structure that may not otherwise offer supportive connection for the nozzle. Mounting of the nozzle to the nozzle manifold occurs by way of threading the nozzle to the nozzle coupling to the likes offered without the use of the nozzle coupling. In some cases, as depicted in FIGS. 15 and 16, it may be desirable to include an angular fitting 69 within the overall construct of the nozzle manifold to further the nozzle's reach and offer manipulation and directional control of the nozzle's dispersion pattern, whereby one end 69*a* of the angular fitting threadably connects to the bore 60, while the second end 69*b* thereof threadably accepts the nozzle 62.

Figures 19, 20:
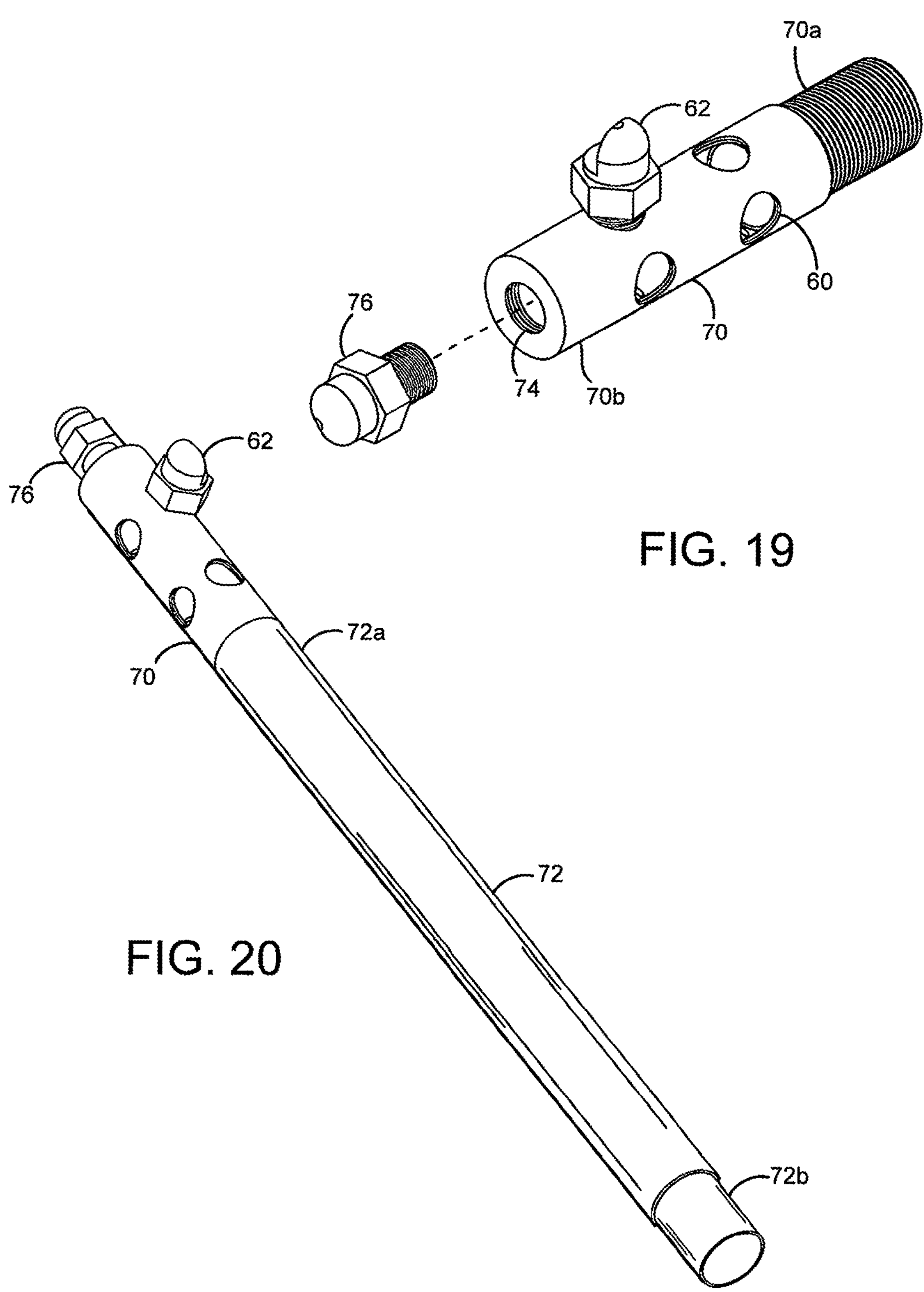
FIG. 19 is a top perspective view of the preferred embodiment of the present invention illustrating an adaptive cylindrical fitting having a first end configured with threads and a circumferential row of multiple bores for threadably receiving within each a nozzle.
FIG. 20 is a top perspective view of the preferred embodiment of the present invention illustrating a conduit having a first end threadably connecting to a first end of an adaptive cylindrical fitting and a second end with a reduced diametric portion.

To fulfill a modular approach that extends to quick interchangeability or repair, the nozzle manifold may be configured as two separable components: an adaptive cylindrical fitting 70 and a conduit 72. In this regard, the adaptive cylindrical fitting is depicted in FIGS. 19 and 20 as comprising a first end 70*a* suitably configured to threadably mate with a first end 72*a* of the conduit, whereas a second end 70*b* of the adaptive cylindrical fitting includes a threaded bore 74 for threadably attaching a bottom nozzle 76 to the likes described above. Comparatively, the second end 72*b* of the conduit is featured with a reduced diametric portion similar to that associated with the first end of the nozzle manifold so as to fulfill connection to the tubular member 55. The adaptive cylindrical fitting is further shown in FIGS. 19 and 20 to include at least one circumferential row of multiple bores 60 to accept within each a nozzle 62 to the likes described above for the nozzle manifold.

Figures 21, 22:
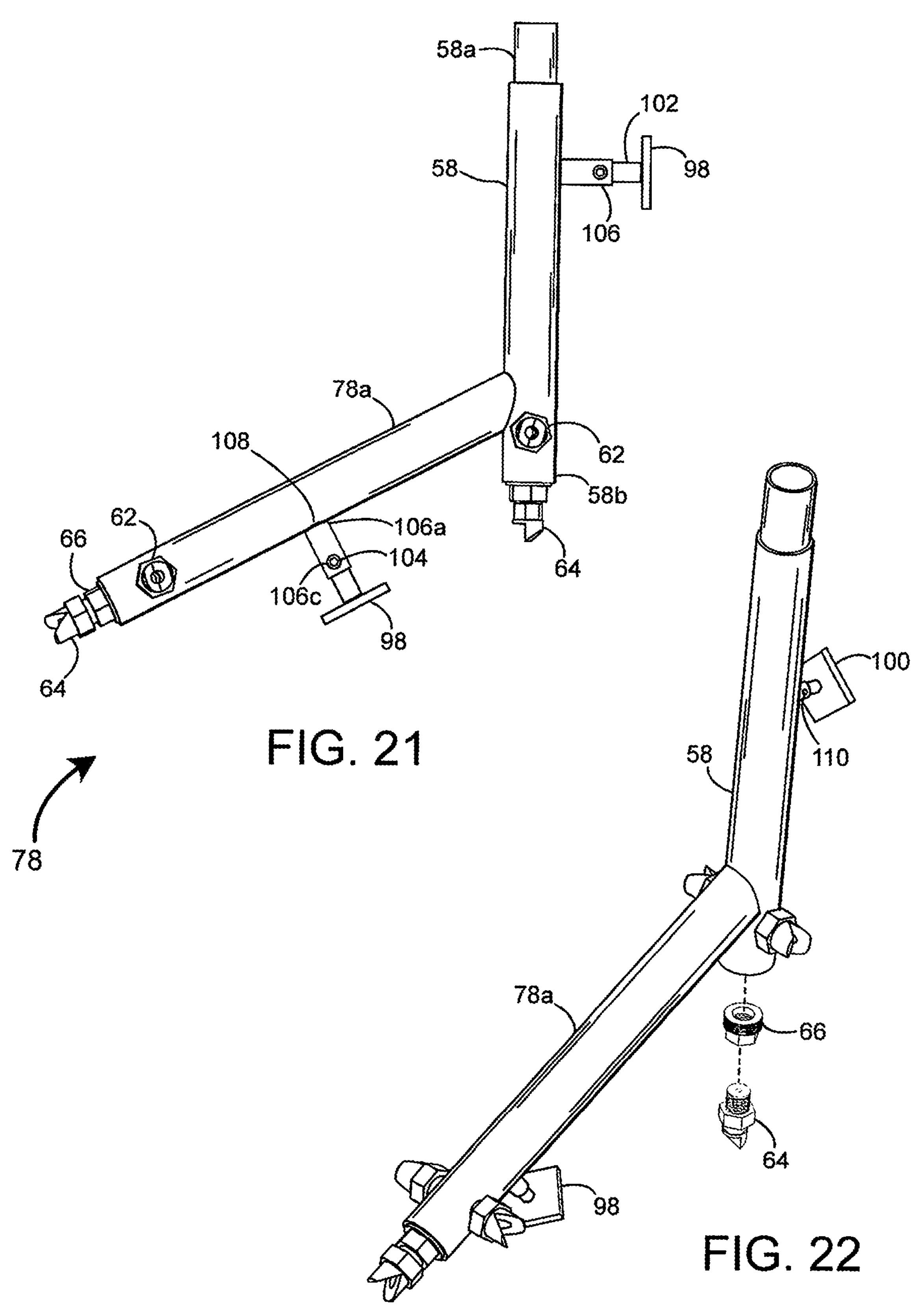
FIG. 21 is a right-side elevational view of the preferred embodiment of the present invention illustrating a nozzle manifold configured with a lower angular portion to form an overall angular-bodied nozzle manifold.
FIG. 22 is a right perspective view of the preferred embodiment of the present invention illustrating an angular-bodied nozzle manifold equipped with a pair of adjustable standoffs each having an adapter plate configured with a post for slidably fitting within an inner bore of a complementary coupler.

In an alternative form of the nozzle manifold, as generally depicted in FIGS. 21 and 22, the nozzle manifold 58 may integrally include a lower angular portion 78*a* to form overall an angular-bodied nozzle manifold 78 that fulfills extended reach inwardly toward the center of the hopper. In this regard, nozzles connecting to and emanating from the circumferential row of bores 60 integrated within the lower angular portion provide opportunity for enhanced dispersion of air flows relatively about the planar surfaces of the incline bottom surface 28 and elsewhere interiorly within the hopper, particularly being advantageous in removing adhering material therefrom. The circumferential row of multiple bores 60 for the lower angular portion may similarly receive a nozzle coupling 68 alignably and fixedly attached thereto for threadably accepting a nozzle 62 to the likes described above for the nozzle manifold generally of linear configuration.

Figures 23, 24:
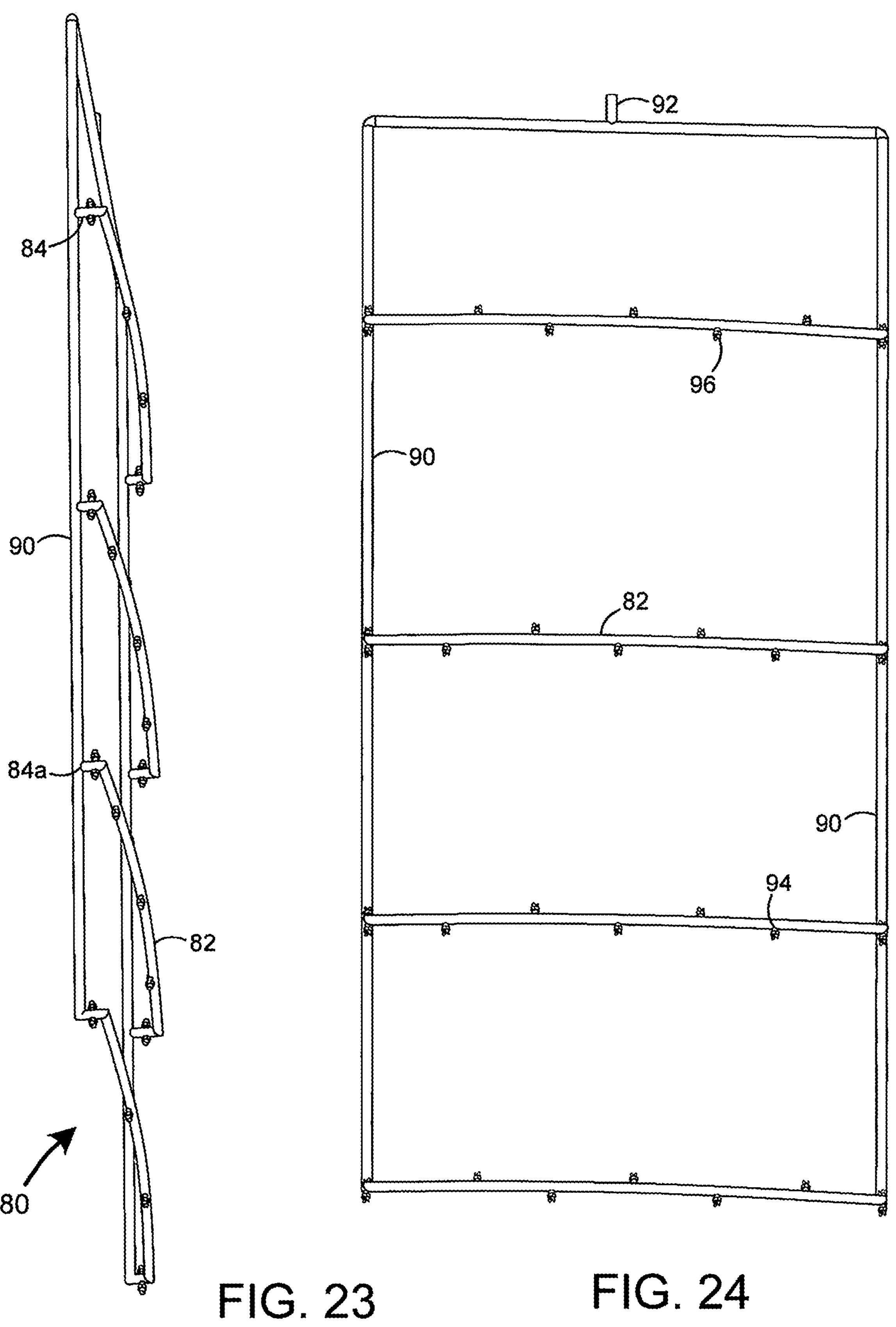
FIG. 23 is a left-side perspective view of the preferred embodiment of the present invention illustrating an overhead rail assembly comprising bowed members each having ends configured with a downward extension connecting to a delivery line.
FIG. 24 is a top plan view of the preferred embodiment of the present invention illustrating an overhead rail assembly comprising bowed members connecting to a delivery line having a common inlet.
Figures 25, 26:
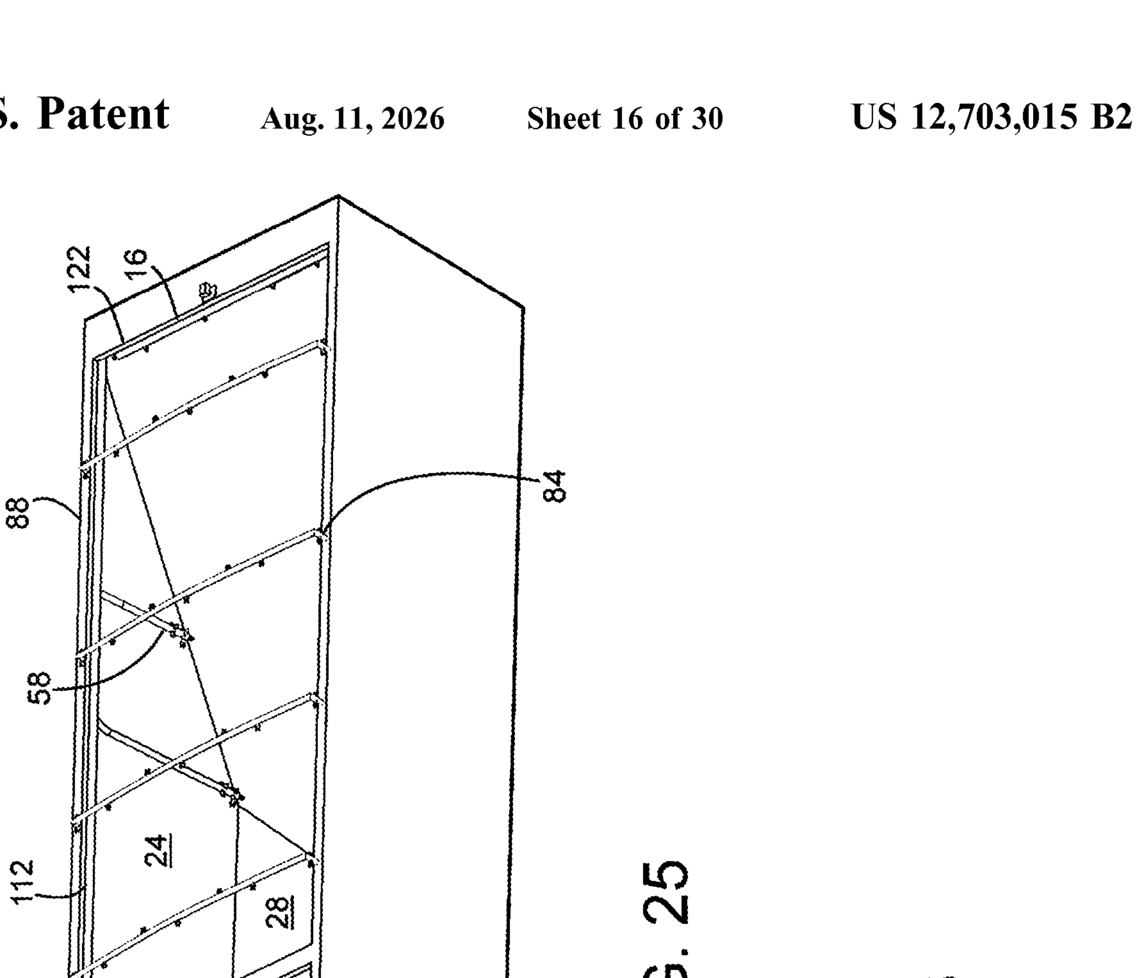
FIG. 25 is a front perspective view of the preferred embodiment of the present invention illustrating a dual-hopper trailer having sidewalls configured with sidewall rail assemblies and an overhead rail assembly.
FIG. 26 is an enlarged view of the preferred embodiment of the present invention illustrating an end of a bowed member having a downward extension extending through a coinciding aperture of a trailer's header.

To fulfill consummate cleaning of each hopper of the trailer, the zonal cleaning system 10 as shown in FIGS. 23 and 24 may incorporate within its overall configuration an overhead rail assembly 80 that particularly targets cleaning of an overhead tarp (not shown) generally associated with and configured for most hopper trailers and the like. In FIGS. 25 and 26, the overhead rail assembly is shown therein as comprising at least one bowed member 82 being configured with a pair of downward extensions 84 at its ends that extend downwardly and pass through coinciding apertures 86 present within the structure of the trailer's header 88. A terminal end 84*a* associated with the downward extension in FIG. 23 connects to and communicates with a delivery line 90 configured with at least one common inlet 92 connecting to the controlled air supply 12. A plurality of bores 94 integrated within the bowed member allow threaded connectivity with an equal number of nozzles 96 of the type generally described above for use with other rail assemblies set forth herein. The bores and associated nozzles in this regard, as depicted in FIGS. 24 and 25, may be staggered relatively about the bowed member 82 to offset those generally present along adjoining bowed members, such that each nozzle is directionally orientated to avoid director head-to-head interaction with the nozzle of the adjoining bowed member. Supplemental bores fitted with nozzles may be integrated within each of the downward extensions to offer removal of settled material from the trailer's header 88, as substantially illustrated in FIG. 26.

Figure 27:
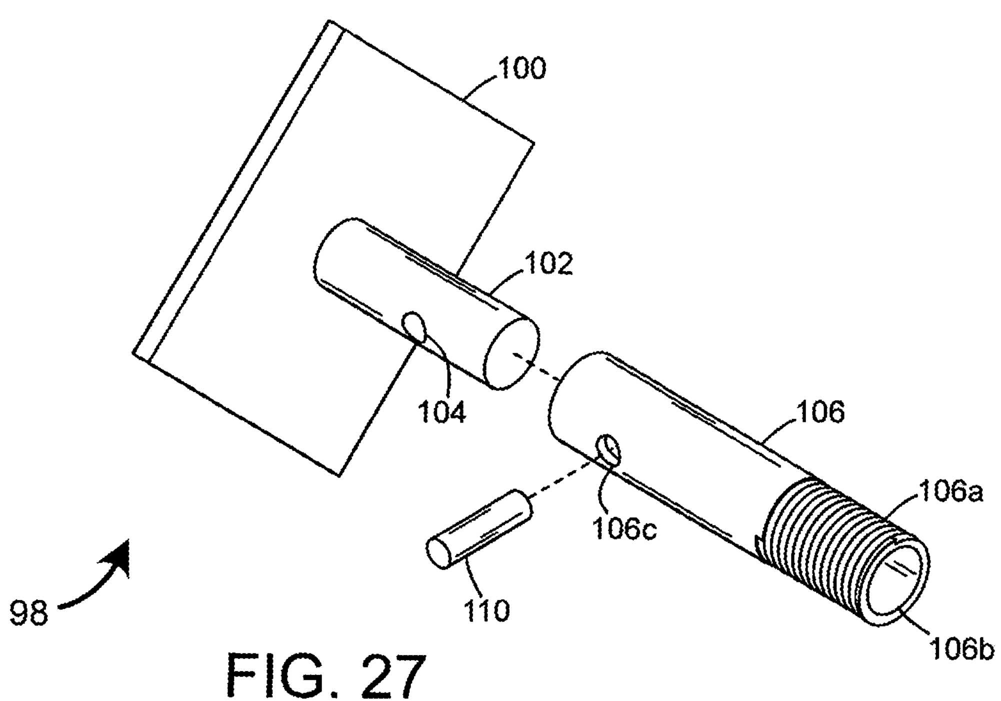
FIG. 27 is an exploded perspective view of the preferred embodiment of the present invention illustrating an adjustable standoff having a pin, an adapter plate configured with a post and a complementary coupler having an inner bore for receiving the post.
Figure 28:
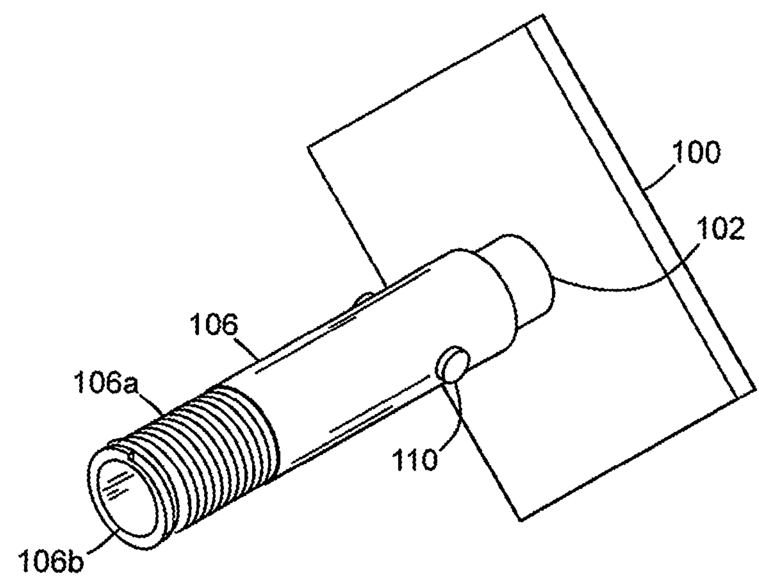
FIG. 28 is a right-side perspective view of the preferred embodiment of the present invention illustrating an adjustable standoff having an adapter plate configured with a post for slidably fitting within an inner bore of a complementary coupler.

In further association of each of the sidewall rail assemblies 18, each of the nozzle manifolds 58 of the drop-down segments 54 may be attached to the hopper's sidewall and incline bottom surface by an adjustable standoff 98 to prevent lateral shift and possible detachment thereof during material loading and unloading operations, as generally depicted in FIGS. 21 and 22. The standoff, as specifically shown in FIGS. 27 and 28, comprises an adapter plate 100 suited for fastening to the sidewalls of the hopper by screws, rivets, and so forth and a post 102 configured with a throughput bore 104 and connecting to and extending generally perpendicular from the adapter plate. A complementary coupler 106 having a threaded end 106*a* threadably engages a threaded bore 108 extending inwardly into the nozzle manifold, whereas an inner bore 106*b*, as configured with a cross bore 106*c*, slidably accepts and receives a portion of the post 102. A pin or bolt 110 slidably positioned within the aligned arrangement of the throughput bore and cross bore secures connection of the drop-down segment and its associated nozzle manifold to the hopper's sidewall and bottom incline surface, generally in the event of adapting use of the angular-bodied nozzle manifold.

Figures 29, 30, 31:
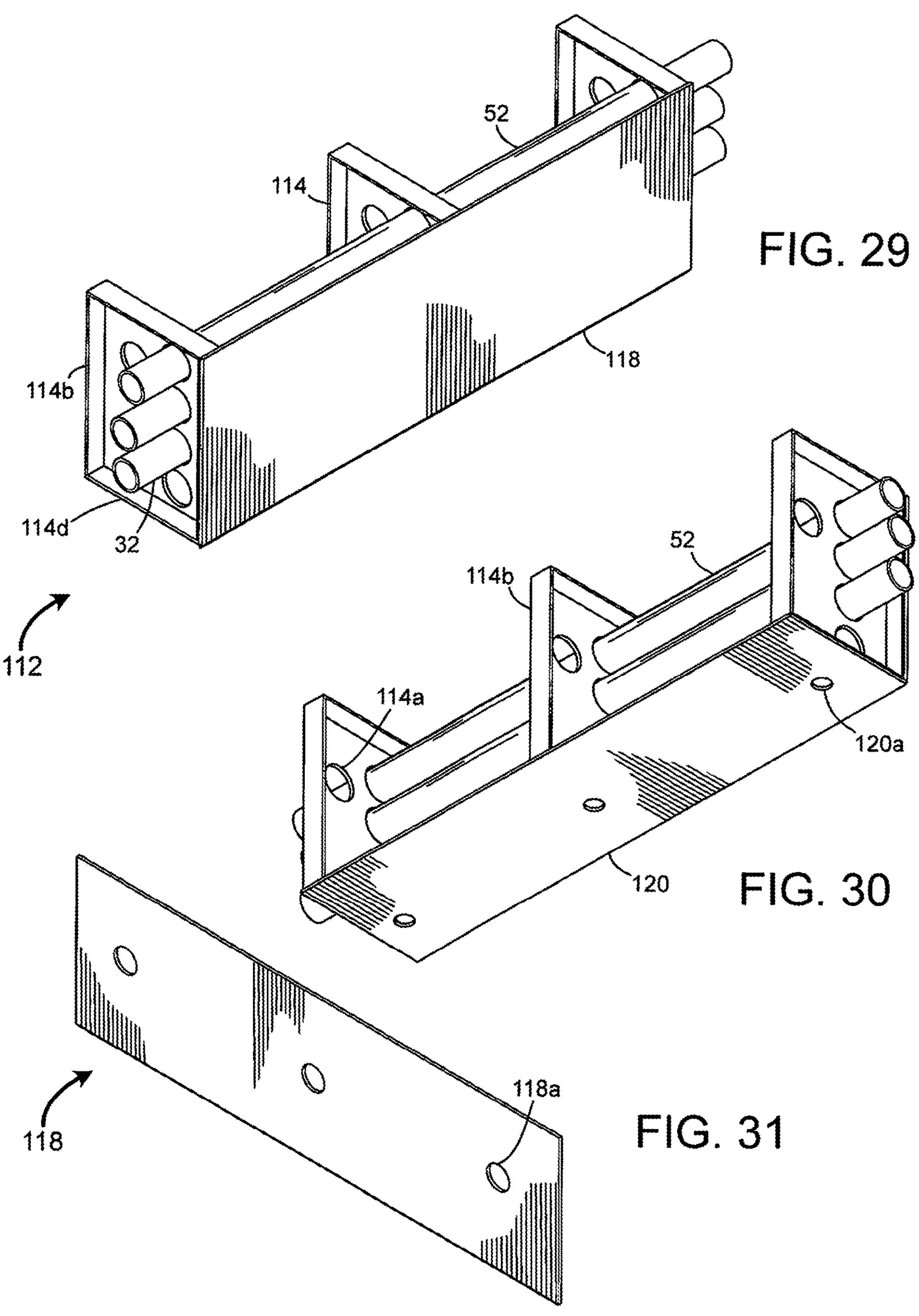
FIG. 29 is a front perspective view of the preferred embodiment of the present invention illustrating an enclosure comprising an outer panel attached to a plurality of outward supports each having multiple openings for passage of lengthen section of pipe associated with an upper rail assembly and fluid delivery line of a sidewall rail assembly.
FIG. 30 is a bottom perspective view of the preferred embodiment of the present invention illustrating an enclosure comprising an outer panel and an underside panel each being attached to a plurality of outward supports.
FIG. 31 is a front perspective view of the preferred embodiment of the present invention illustrating an outer panel having an arrangement of apertures for accommodating nozzles associated with an end wall rail assembly.
Figures 32, 33:
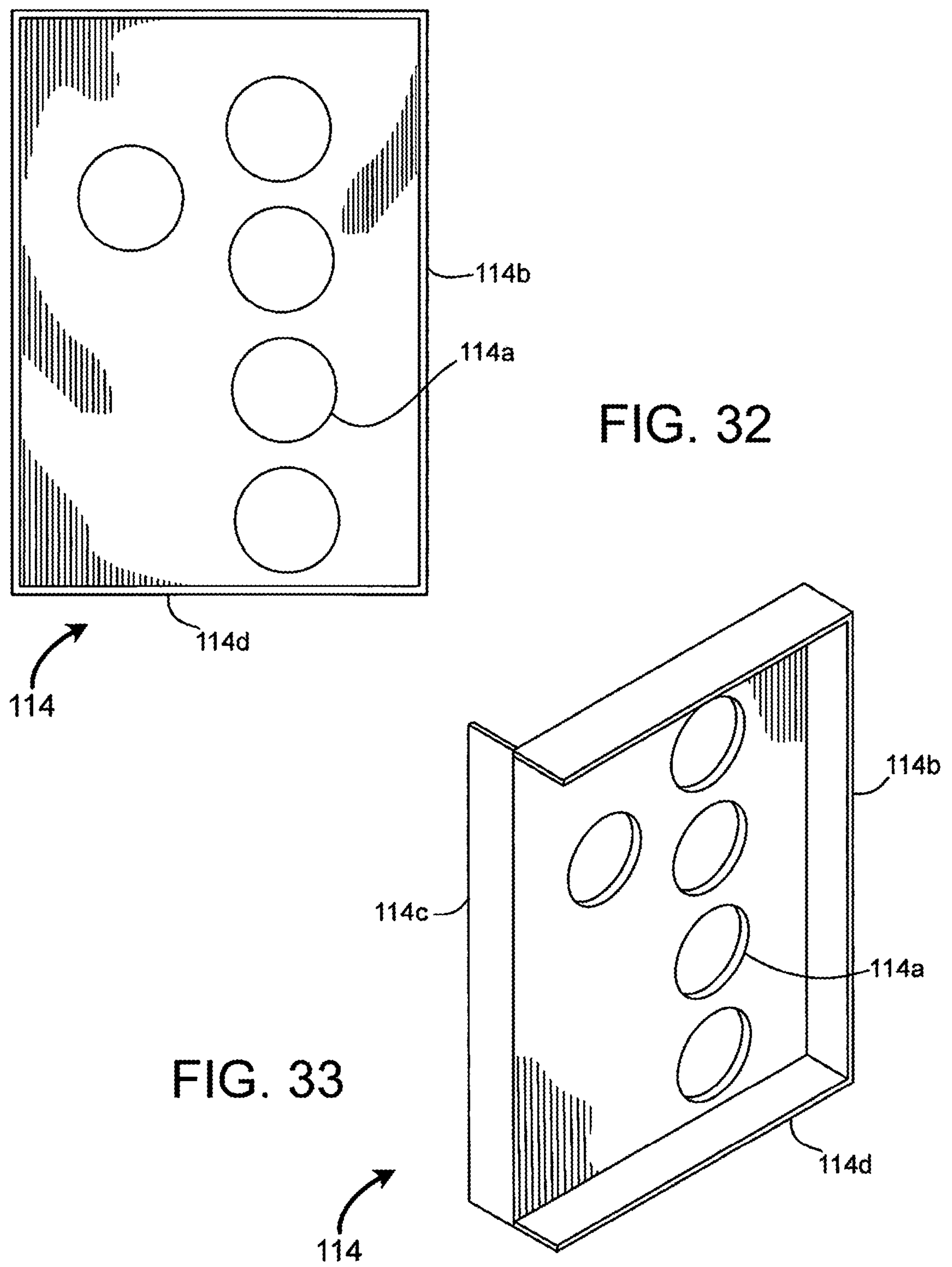
FIG. 32 is a left-side elevational view of the preferred embodiment of the present invention illustrating an outward support having multiple openings and a perimeter flange.
FIG. 33 is a left-side perspective view of the preferred embodiment of the present invention illustrating an outward support having multiple openings and a perimeter flange configured with a bottom flange portion and a rearward portion.

As illustrated in FIGS. 29 and 30, the upper rail assembly, end rail assembly, fluid delivery lines of the sidewall rail assembly, and delivery lines of the overhead rail, when securely attached to the walls of the hopper may be partially or wholly housed within an enclosure 112 extending lengthwise along the upper portions of the sidewalls and end walls to lessen intrusion of material into the formed crevices and interstitial space surrounding the lengthened sections of pipes 32, 44 of the upper and end rail assemblies, fluid delivery line 52 and so forth. Attachment of the enclosure to select areas of the trailer is accomplished by outward supports 114 of the type illustrated in FIGS. 32 and 33, with each being configured with multiple openings 114*a* extending therethrough to accommodate passage of the lengthened sections of pipe associated with the individual rail assemblies and a perimeter flange 114*b* serving as suitable structure for mounting the outward support to the hopper's sidewalls and an underside portion 116 of the header as well as accommodating attachment of an outer panel 118, typically by fasteners of the type recognize in the art for such applications, namely screws, rivets, welds, and so forth. To gain unrestricted access to mount the outward support to a trailer's sidewall, a rearward portion 114*c* of the perimeter flange may extend in an opposing direction, such as shown in FIG. 33. In most applications, the enclosure extending lengthwise along the hopper's sidewall is generally left open relatively about its underside to permit convenient passage of the drop-down segments of the sidewall rail assembly. Contrarily, as shown in FIG. 30, it may be desirable to advance full encasement of the pipes associated with each of the rail assemblies by means of an underside panel 120 attached to a bottom flange portion 114*d* of the perimeter flange, whereby a series of apertures 120*a* extending therethrough suitably accommodate passage of the nozzles associated with the upper rail assembly as well as the drop-down segments of the sidewall rail assembly.

The construct of the enclosure for the end wall differs from that of the sidewalls, whereby the outer panel in FIG. 31 may consist of an arrangement of apertures 118*a* each being configured to accommodate passage of a head portion 46*a* of each of the nozzles 46 associated with the end rail assembly 16 for unrestricted fluid flow therethrough and into the hopper's interior space. Given the proximal relationship of the incline bottom surface of the hopper to that of the hopper's rear header 122, attachment of the outer panel to the outward support or directly to the end wall of the trailer without the outward support may sufficiently fulfill complete encasement of the end rail assembly without the need of supplementing the enclosure with the underside panel described above for the hopper's sidewall.

Figures 34, 35, 36, 37:
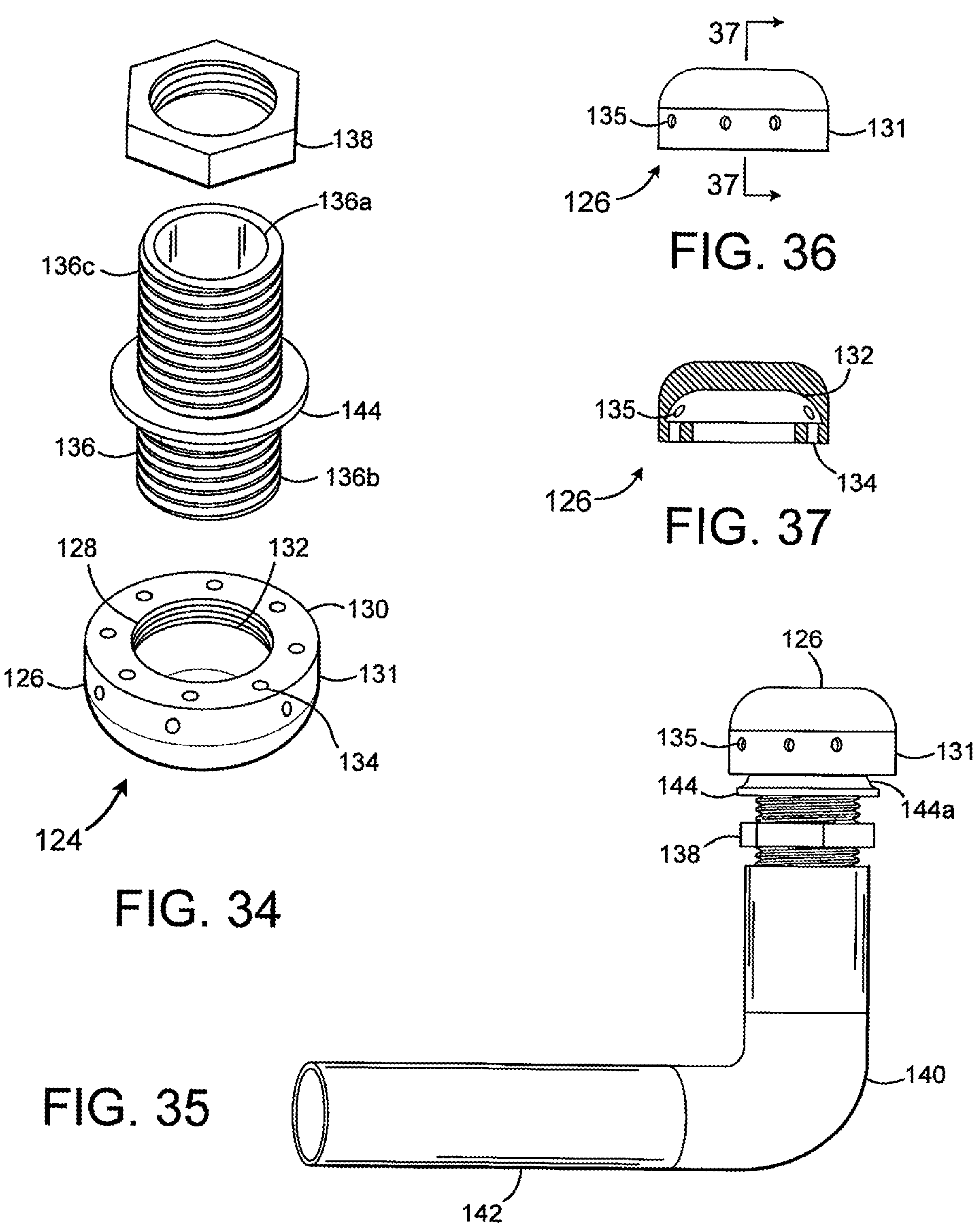
FIG. 34 is a bottom perspective view of the preferred embodiment of the present invention illustrating a domed nozzle having a mount coupling with first and second threaded ends, a domed cap, and a nut.
FIG. 35 is a left side elevational view of the preferred embodiment of the present invention illustrating a domed nozzle fitted with a circumferential deflector rim and a mount coupling threadably connecting to a fitting.
FIG. 36 is a front elevational view of the preferred embodiment of the present invention illustrating a domed cap having a circumferential exterior wall configured with a plurality of cross bores.
FIG. 37 is a cross sectional view of the preferred embodiment of the present invention taken along lines 37-37 in FIG. 36 illustrating a domed cap having a cavity communicating with a plurality of bores of an annular bottom edge and a plurality of cross bores of a circumferential exterior wall.

In complementing the end, upper and sidewall rail assemblies, the zonal cleaning system 10 supplementally comprises one or more domed nozzles 124 to assistively remove persistent adhering materials relatively existing about planar surfaces that may not otherwise be adequately removed by the collective arrangement of nozzles affiliated with the individual rail assemblies. The domed nozzle is shown in FIGS. 34-37 as comprising a domed cap 126 configured with a threaded internal bore 128, an annular bottom edge 130 concentric therewith, a circumferential exterior wall 131, and a cavity 132 existing above the threaded internal bore 128. A plurality of inward bores 134 existing relatively about the annular bottom edge and a plurality of cross bores 135 existing relatively about the circumferential exterior wall collectively extend inward to communicate with the cavity, as illustrated in FIGS. 36 and 37. FIG. 34 depicts a mount coupling 136 having a cylindrical bore 136*a* and first and second threaded ends 136*b*, 136*c*, wherein the first threaded end threadably mates with the threaded internal bore 128. The second threaded end is further shown in FIG. 35 as being threadably connected with a nut 138 that serves to securely mount the domed nozzle to the planar surface, in addition to fulfilling threaded connectively with a fitting 140 suited for establishing connection to a section of pipe 142 connecting to and extending from the controlled air supply 12. A circumferential deflector rim 144 located in between the first and second threaded ends and having a curvature side 144*a* fulfills directional dispersion of air flow outwardly from the domed nozzle relatively about and along the planar surface. The inward bores 134 and cross bores 135 respectively associated with the annular bottom edge and circumferential exterior wall 131 may exist evenly spaced about their respective structures to establish a 360-degree dispersion pattern, or portion thereof for controlled radial dispersion therefrom. In certain applications, it is desirable to employ use of multiple domed nozzles 124 to the likes shown in FIGS. 7 and 8 that cumulatively offer overlapping dispersion patterns for enhanced effectiveness in removing persistent, adhering material from the planar surface.

Figures 38, 39, 40:
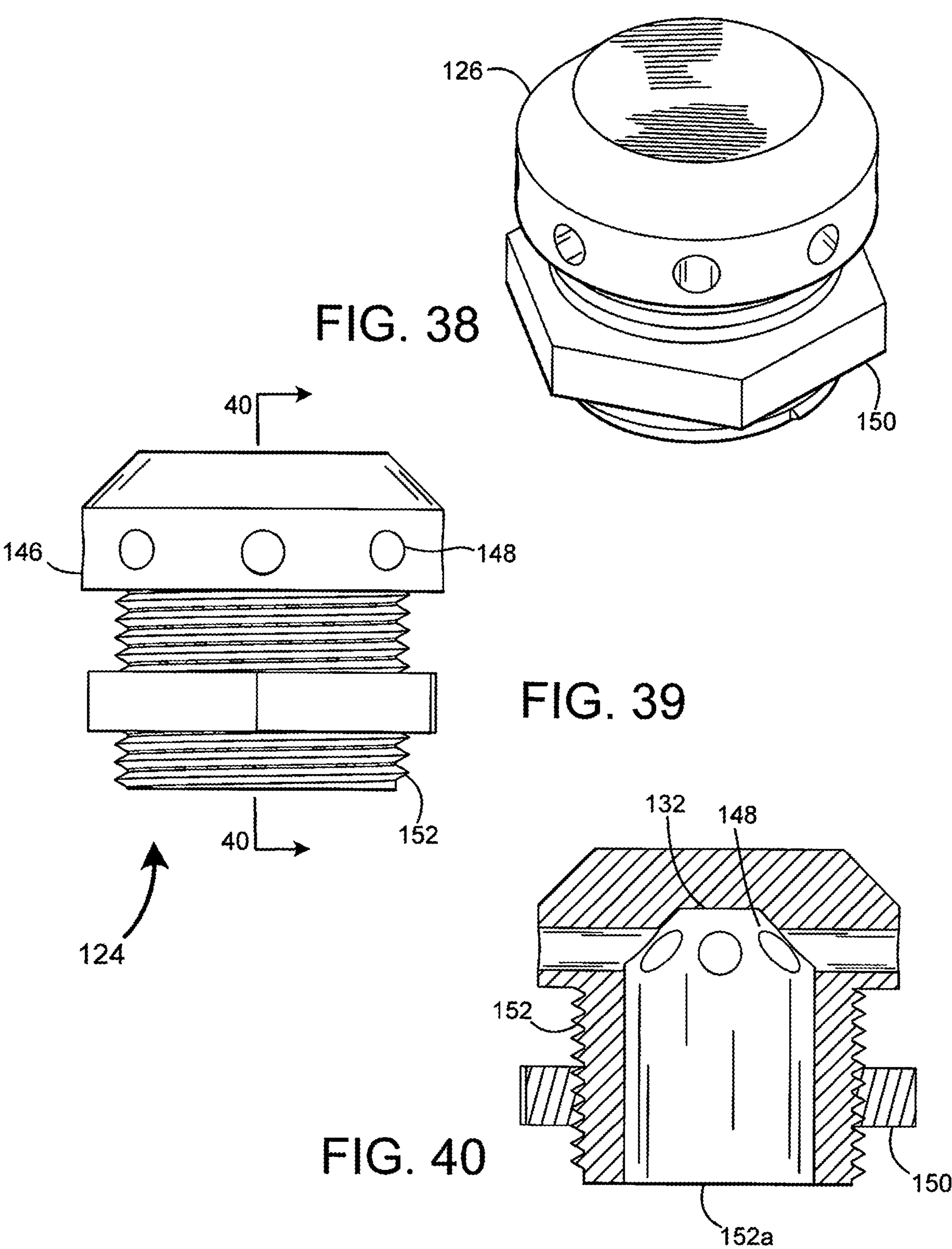
FIG. 38 is a top perspective view of the preferred embodiment of the present invention illustrating a second form of a domed nozzle having a domed cap configured with an outer circumferential surface with a plurality of bores.
FIG. 39 is a front elevational view of the preferred embodiment of the present invention illustrating a second form of a domed nozzle having a threaded stem threadably fitted with a nut.
FIG. 40 is a cross sectional view of the preferred embodiment of the present invention taken along lines 40-40 in FIG. 39 illustrating a second form of a domed nozzle having a threaded stem configured with a cylindrical bore and threadably fitted with a nut.

In a second, alternative form of the domed nozzle, as illustrated in FIGS. 38-40, an outer circumferential surface 146 of the domed cap 126 may incorporate a plurality of bores 148 in lieu of those present in the annular bottom edge, particularly being arranged to extend radially inward to communicate with the cavity 132. Like the first form of the domed nozzle, the bores may exist circumferentially about the domed cap to establish a 360-degree dispersion pattern, or part thereof for focused radial dispersion, whereas a mount nut 150 threadably attached to a threaded stem 152 configured with a cylindrical bore 152*a* and integrally connecting to and extending from the domed cap adequately serves to fasten the domed nozzle to the planar surface. However, unlike the first form of the domed nozzle, the second form operates without the requirements of the circumferential deflector rim 144 given that the bores 148 extend relatively parallel to the planar surface to effect lateral outward dispersion of fluid therefrom. Common fittings 140 of the type available in art, like that shown in FIG. 35, may be used to effect connection of the second form of the domed nozzle to the section of pipe 142 extending from the controlled air supply.

Figure 2:
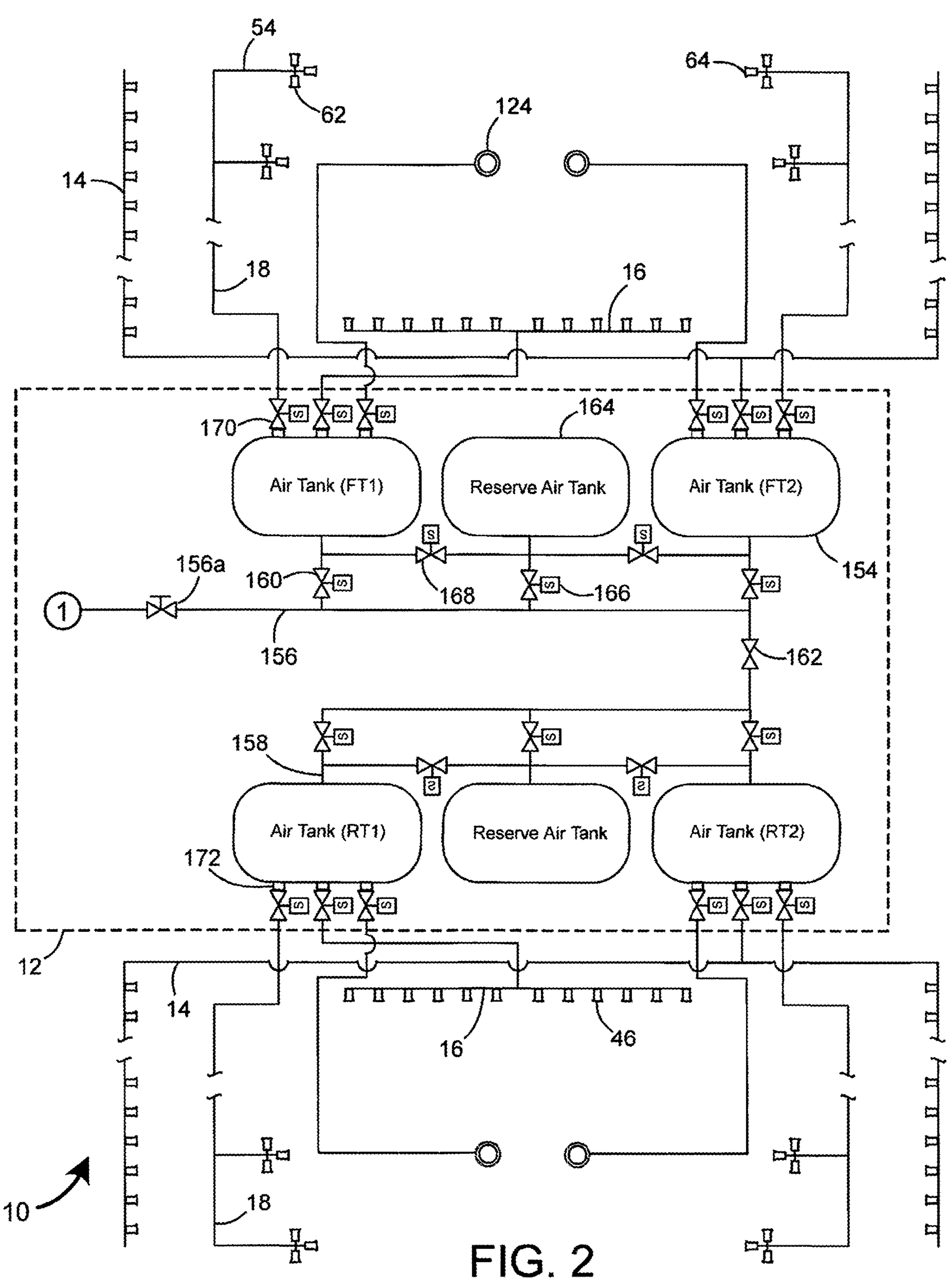
FIG. 2 is a schematic view of the preferred embodiment of the present invention illustrating a controlled air supply comprising at least two air tanks associated with each hopper of a dual-hopper trailer, a pair of sidewall rail assemblies, an upper rail assembly, and an end wall rail assembly each having an inlet end connecting to an outlet valve attached to the air tank.
Figures 3, 4:
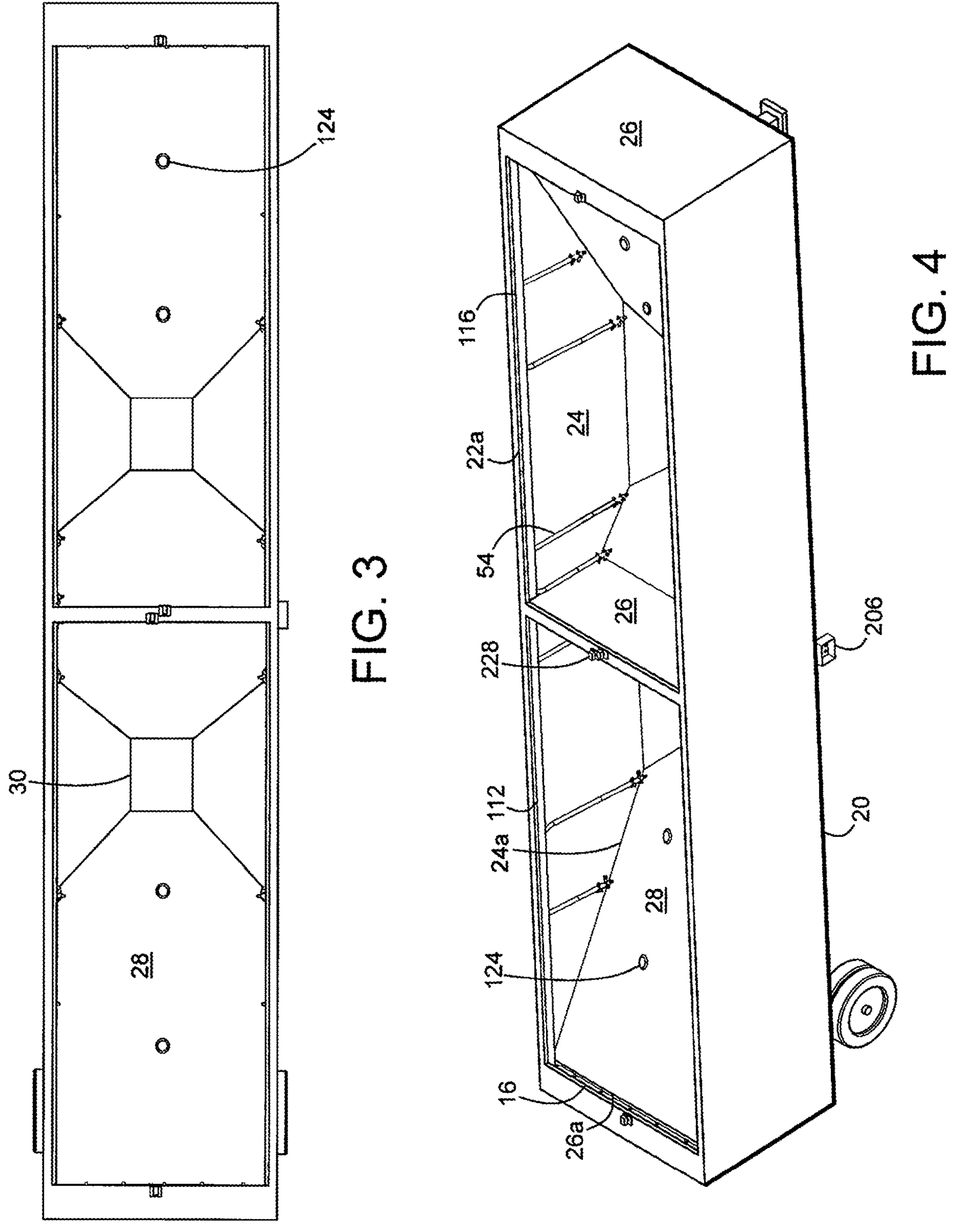
FIG. 3 is a top plan view of the preferred embodiment of the present invention illustrating a dual-hopper trailer having incline bottom surfaces configured with domed nozzles.
FIG. 4 is a front perspective view of the preferred embodiment of the present invention illustrating a dual-hopper trailer having sidewalls configured with sidewall rail assemblies.

In reference to FIG. 2, the controlled air supply 12 is shown therein as comprising an arrangement of at least two air tanks 154 designated for each hopper 22 of the trailer 20, particularly as such to fulfill separable unloading and cleaning operations as in the typical case of a trailer having dual hoppers positioned end to end. The air tanks designated for each hopper is further shown as being arranged in parallel and connected to a main supply line 156 extending from and connecting to air supply means. A feeder line 158 may be used to establish connection of each air tank to the main supply line to adequately accommodate placement of and access to the arrangement of air tanks and air refill valves 160 associated therewith within the spatial limitations existing interiorly within the structure of the trailer, as generally depicted in FIG. 2. In the exemplarily case of a trailer configured with dual hoppers 22, a rearward hopper and a forward hopper positioned end to end, the main supply line extends from air supply means and continues therefrom to afford continuity of connection of the air tanks existing in vicinity of the rearward and forward hoppers. As further shown in FIG. 2, shutoff valves 162 may be incorporated inline along the main supply line 156, generally in between the rearward and forward arrangements of air tanks, to isolate the air tanks 154 for occasional maintenance, further operational control of the air supply to the air tanks, or safeguard against components of the tractor-trailer arrangement that operably interact with the zonal cleaning system 10. Shutoff valves most appropriate for this purpose may consist of a ball valve or a gate valve which may be manually- or electrically-operated.

In certain applications, it may be desirable to supplement the dual arrangement of air tanks in FIG. 2 with one or more reserve air tanks 164 that aptly connects to the main supply line to offer immediate replenishment of air into the air tank as it is being used in normal cleaning operations. FIG. 2 illustrates exemplary connectivity of the reserve air tank, wherein a valved inlet port 166 may be configured to connect to the main supply line if desired, while a pair of valved outlet ports 168 each connect to the feeder lines 158 of the individual air tanks associated with the zonal cleaning system. Alternatively, the reserve air tank may connect directly inline with the main supply line 156 to store a predetermined amount of pressurized air for immediate delivery to each air tank of the rearward and forward hoppers on an as-needed basis. The extent by which the reserve air tank and associated valves operate in conjunction with the air tanks of the zonal cleaning system may be fulfilled by other operational aspects of the controlled air supply 12 set forth hereinafter.

Figure 41:
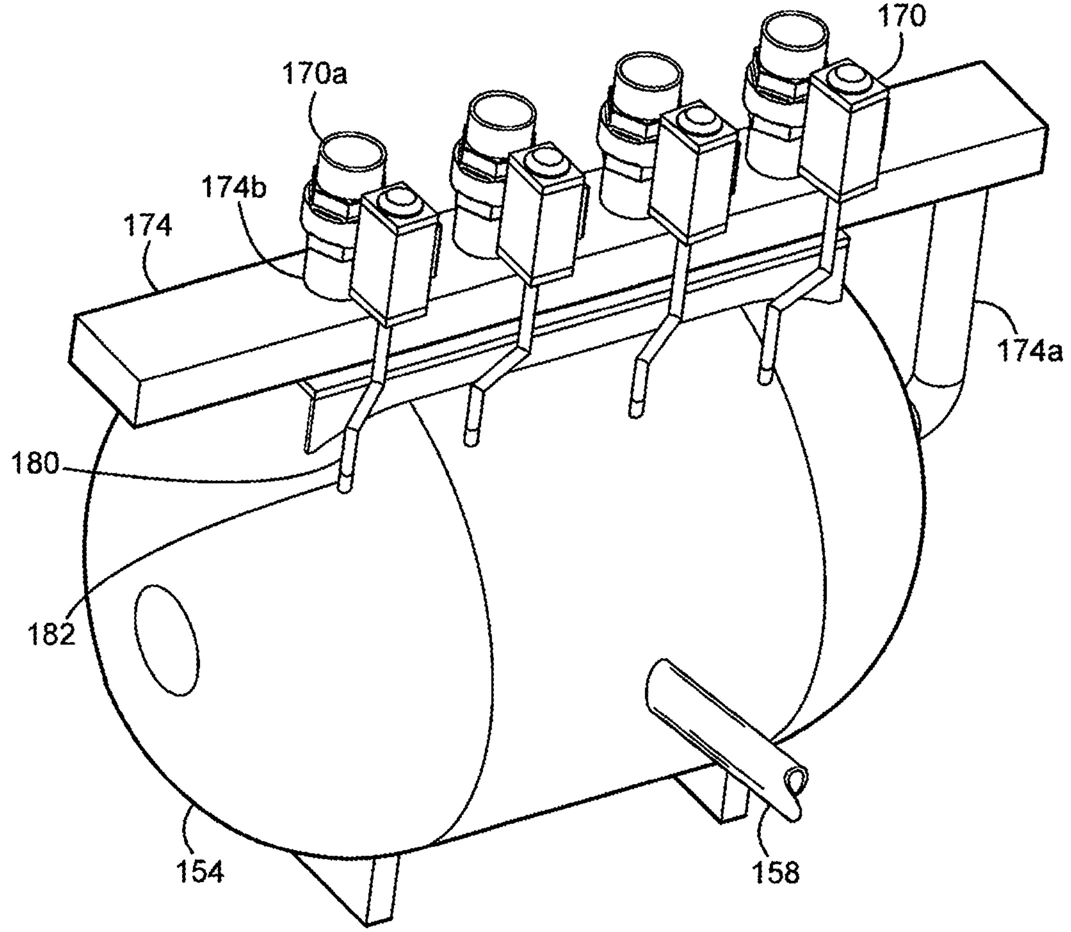
FIG. 41 is a front perspective view of the preferred embodiment of the present invention illustrating a box manifold attached to an air tank and having multiple outlet ports fitted with outlet valves in equal number.
Figure 42:
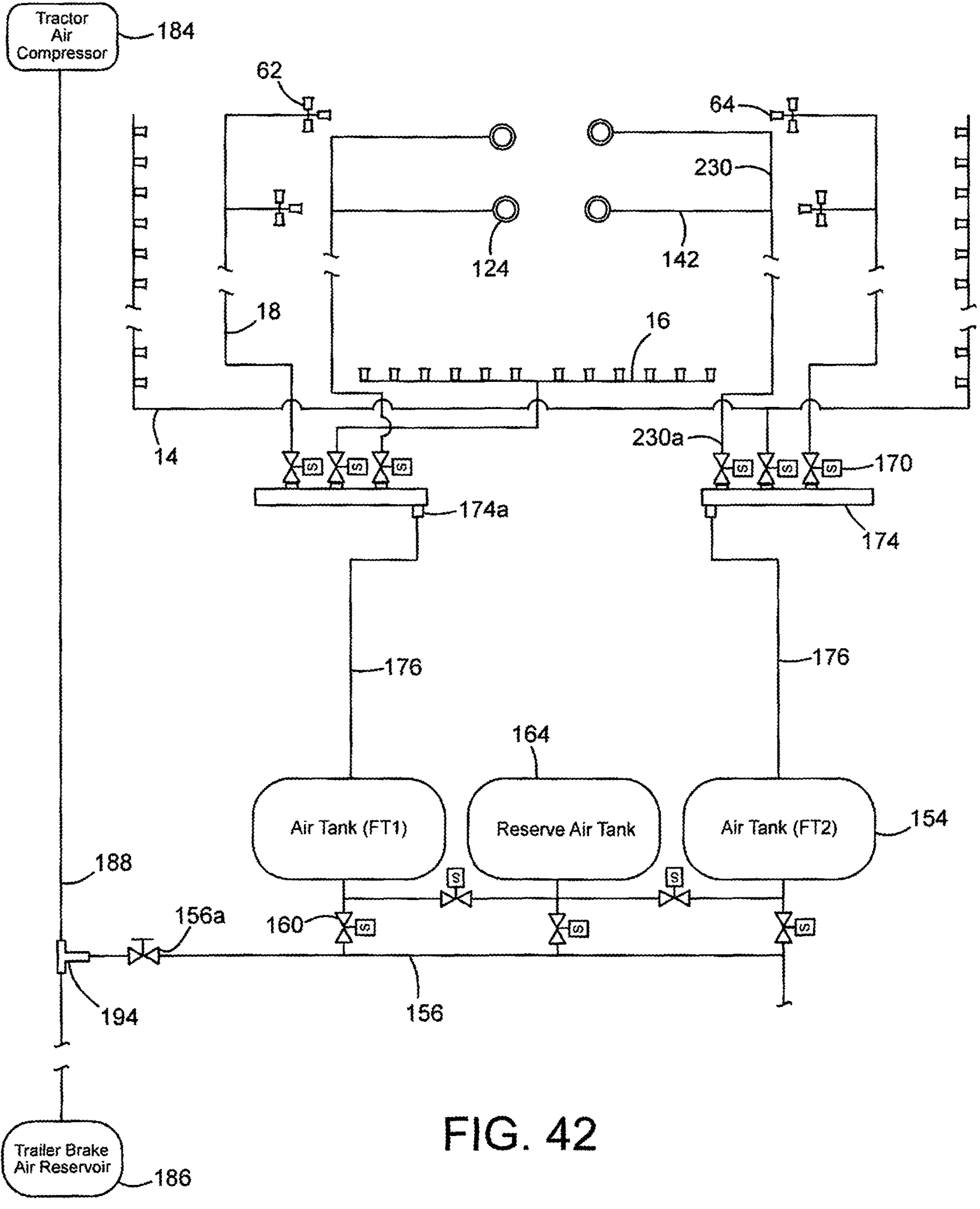
FIG. 42 is a schematic view of the preferred embodiment of the present invention illustrating a controlled air supply directed to one hopper of a dual-hopper trailer and having a box manifold separable from a pair of air tanks and fitted with multiple outlet valves.

As generally illustrated in FIGS. 1 and 2, each air tank 154 is further associated with one or more outlet valves 170 of the type suited to operably communicate and interact with controller means for controlling and regulating the flow or amount of air entering and passing through each of the connecting upper, end wall, sidewall, and overhead rail assemblies and domed nozzles for eventual entry into and distribution within the hopper 22 of the trailer. It is conceivable that each of the outlet valves associated with each air tank may connect directly therewith by way of a coupling 172 or connect to a box manifold 174 of the type shown in FIG. 41 that includes a single input line 174*a* connecting directly to the air tank and multiple outlet ports 174*b* for accommodating attachment of the outlet valves coinciding in number therewith. In some applications, it may be desirable to separate the box manifold from its corresponding air tank to accommodate placement of the air tank in confined spaces within the trailer. In FIG. 42, a pipe segment 176 extending from the air tank to the box manifold yields capability to position the box manifold 174 and its associated connecting outlet valves 170 in close proximity to the nozzles associated with the individual rail assemblies so as to possibly lessen observable pressure drops for an appreciable reduction of the response time for outward air flow through the nozzles. Regardless of the configuration, with or without use of the box manifold, the outlet valve may be one consisting of a 2-way or 3-way, normally closed solenoid valve electrically coupled to an onboard power source 178 and momentarily energized according to the operating parameters set forth for controller means to advance air flow through the valve's outlet port and into the coinciding, connecting rail assembly cyclically at a predetermined time interval. In instances of incorporating a 3-way solenoid configured for the outlet valve 170 and fulfilling its operation, an air supply line 180 connecting to a port 182 associated with the air tank and the outlet valve may be required to pneumatically assist in moving an internal plunger (not shown) in such manner to advance air flow through the outlet valve's outlet port 170*a*.

Figures 2A, 2B, 2C:
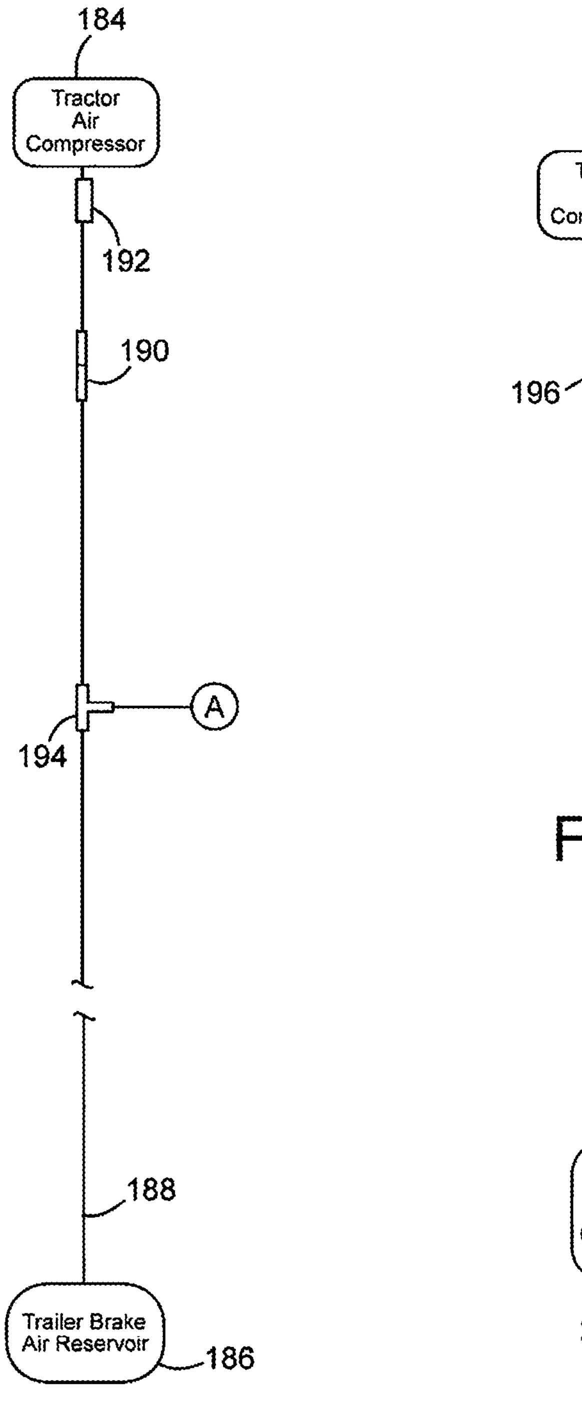
FIG. 2A is a schematic view of the preferred embodiment of the present invention illustrating a tractor air compressor having a governor and connecting to a trailer brake reservoir by way of an air brake supply line configured with a fitting to fulfill connectivity with a main supply line.
FIG. 2B is a schematic view of the preferred embodiment of the present invention illustrating a tractor air compressor connecting to an auxiliary line configured with a fitting to fulfill connectivity with a main supply line.
FIG. 2C is a schematic view of the preferred embodiment of the present invention illustrating an air compressor connecting to an air hose configured with an air hose coupler for mating with an air receiver fitting to fulfill connectivity with a main supply line.

Referring now to FIGS. 2A, 2B, and 2C, air supply means in its operative capacity serves to generate compressed air at a predetermined pressure for delivery to the air tanks 154 through the main supply line 156. In a first form of air supply means, as shown in FIG. 2A and suited to connect to the main supply line 156 in FIG. 2 at A-1, the zonal cleaning system 10 incorporates use of an onboard air compressor 184 operably associated with a trailer brake system. The trailer brake system in particular operates on the principles of pneumatics and typically includes an air compressor housed within an engine compartment of a tractor or semi-trailer truck, one or more brake air reservoirs 186 generally existing near a rearward portion of the trailer, and an air brake supply line 188 extending from the air compressor to the air reservoir, whereby glad hands or couplers 190 facilitate connection of the air lines between the tractor and trailer. The brake system will typically include branch air lines leading to a number of brake chambers (not shown) that fulfill braking operations for the trailer. In most operational scenarios, a governor 192 controls when the tractor's air compressor will pump air into the air reservoirs. Typically, when the air reservoir pressure rises to the "cut-out" level (generally no higher than 135 psi), the governor stops the tractor's air compressor from pumping or supplying air. Comparatively, when the air reservoir pressure falls to the "cut-in" pressure (typically no lower than 85 psi), the governor allows the air compressor to start pumping again. Accordingly, it is desirable to advance use of the trailer brake system in its existing operative capacity for purposes of satisfying the operational requirements of air supply means, whereby a supply of pressurized air can be delivered to the air tanks of the zonal cleaning system 10 to the extent allowable by the governor. FIGS. 2 and 2A illustrates connectivity of the brake system with that of the main supply line 156, whereby a t-fitting 194 aptly connects to the air brake supply line 188 with further provisions of accommodating inline a manually-operated shutoff valve 156*a* or a pressure protection shutoff valve 156*b* of the type typically rated at 90 psi, particularly being useful to isolate the air tanks 154 of the zonal cleaning system 10 from the trailer brake system to avoid detrimental impact thereto during use and non-use of the zonal cleaning system.

In a second form of air supply means, as shown in FIG. 2B and suited to connect to the main supply line 156 in FIG. 2 at B-1, an auxiliary line 196 extending from the onboard air compressor 184 associated with the tractor's brake system and connecting to the main supply line 156 by way of a fitting 196*a* may sufficiently serve to supply air directly to the air tanks. In this regard, the auxiliary line by-passes the governor 192 that allows for unrestricted air flow to the air tanks for re-filling operations, but being limited to the extent of the output capabilities of the tractor's onboard air compressor 184.

In a third form of air supply means, as shown in FIG. 2C and suited to connect to the main supply line 156 in FIG. 2 at C-1, incorporates inline an air receiver fitting 198 adaptably configured to mate with an air hose coupler 200*a* commonly associated with an air hose 200 that connects to and extends from an air compressor 202. The air compressor in this capacity may exist external to and apart from the tractor-trailer arrangement, such as those that may be readily available at a material unloading transfer station, for example, or carried and stowed onboard with the tractor or trailer. In the instance of its use, pressurized air can be delivered to the air tanks 154 of the zonal cleaning system 10 continuously to the extent of the output capabilities of the external air compressor. Since the external air compressor 202 may not reliably exist at all material unloading transfer stations or perhaps be inconvenient for onboard stowage in some cases, it may be desirable or advantageous to incorporate both forms of air supply means within the overall configuration of the zonal cleaning system to further flexibility of operation thereof.

Figure 43:
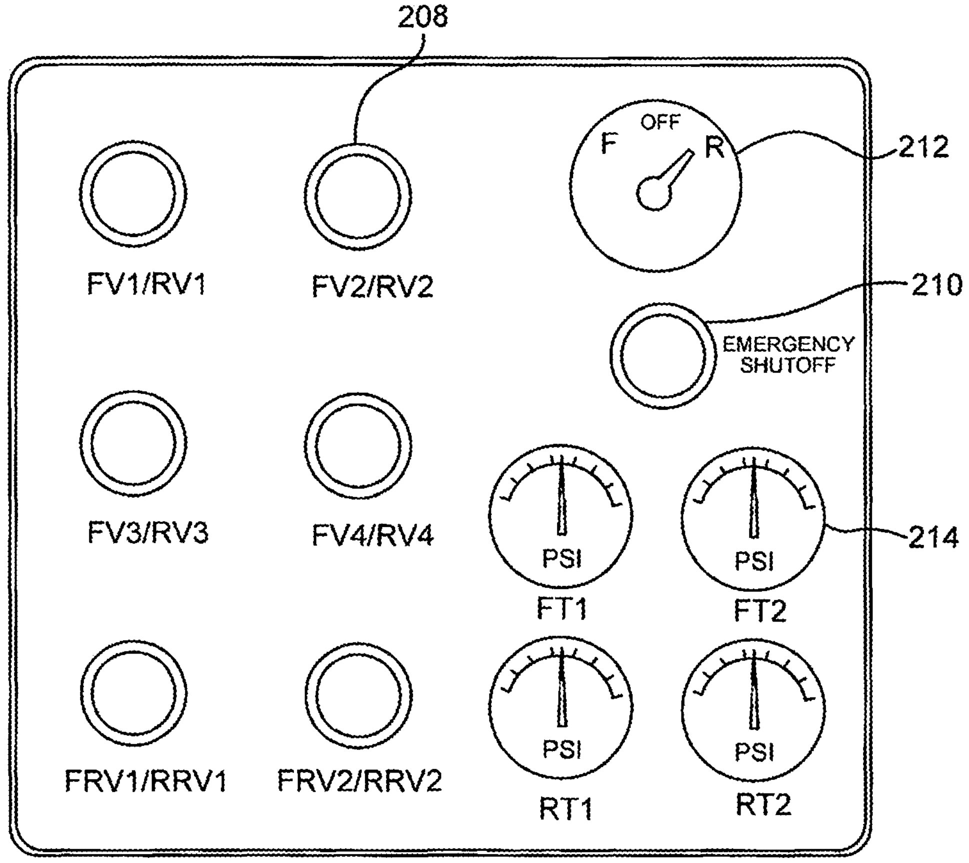
FIG. 43 is a front elevational view of the preferred embodiment of the present invention illustrating a manual switch panel having pressure gauges and momentary push buttons for activating outlet valves associated with at least two air tanks.
Figure 43:
Figure 44:
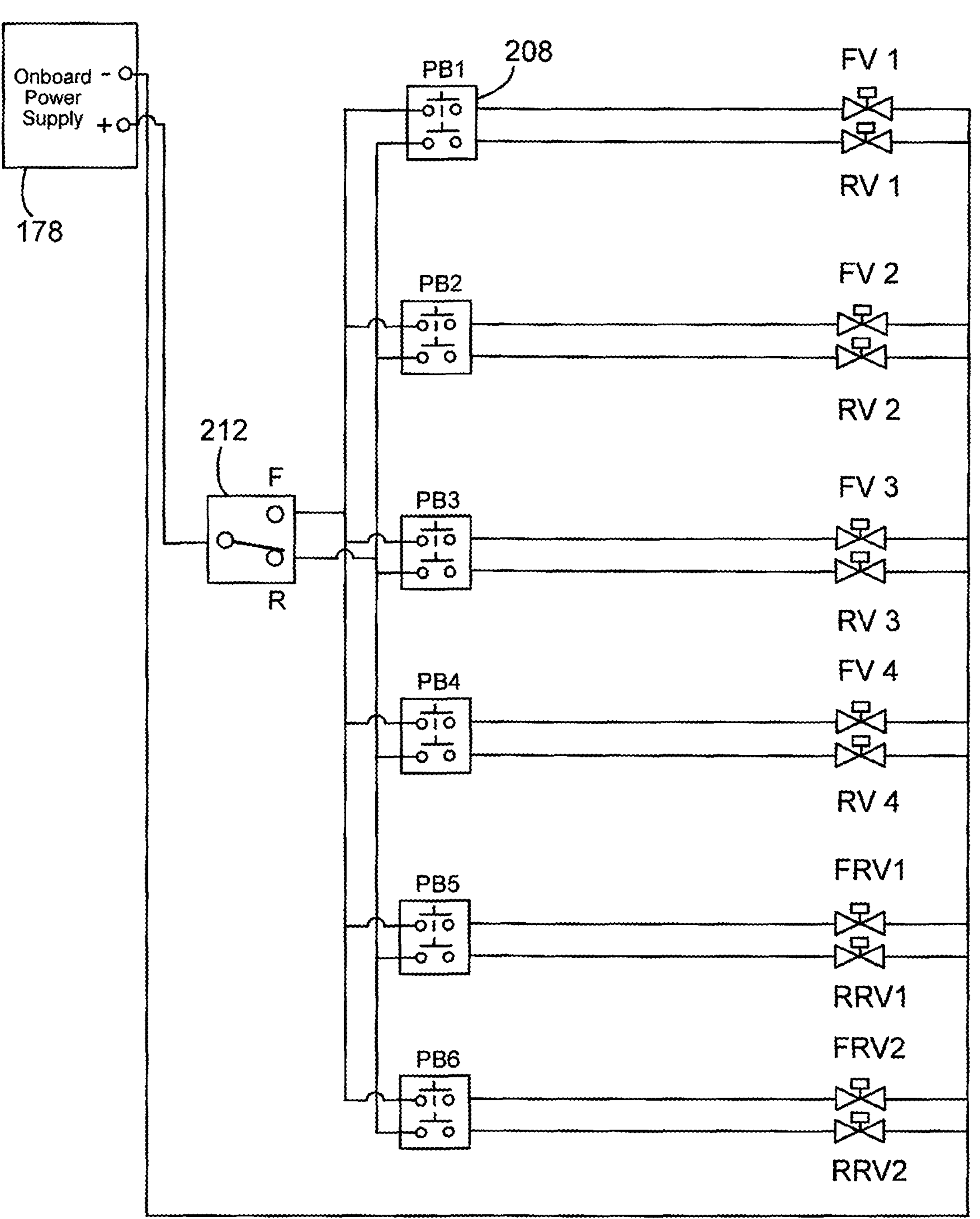
FIG. 44 is a schematic view of the preferred embodiment of the present invention illustrating controller means in the form of a manual switch panel having momentary push buttons for activating operation of outlet and air refill valves associated with at least two air tanks for each hopper of a dual-hopper trailer.

Control of the zonal cleaning system 10, as shown in FIGS. 43 and 44, is facilitated by controller means, which in simplified form comprises a manual switch panel 204 being encased within a protective enclosure 206 and including momentary push buttons (PB1-PB4) 208 suited to effect corresponding operation of the outlet valves and an emergency shutoff switch 210. In the exemplary case of incorporating four outlet valves divided between dual air tanks, as particularly configured for each of the forward and rearward hoppers 22, the monetary push buttons are electrically coupled to the onboard power source 178, typically at 12V, via a selector switch 212 that isolates the power supply between the forward and rearward hoppers, respectively designated at the selector switch as F or R in FIG. 43. Upon activation and continued depression of the push button 208, power is transmitted to the corresponding, electrically coupled outlet valve 170 and operates for a predetermined amount of time to allow air to flow from the air tank and into and through the designated, connected rail assembly and outwardly through the attached nozzles for eventual entry into the hopper. In order to monitor availability and use of pressurized air in the air tanks 154, the manual switch panel 204 as shown in FIG. 43 includes multiple pressure gauges 214 each designated for and conventionally connected to the air tank.

Figure 45:
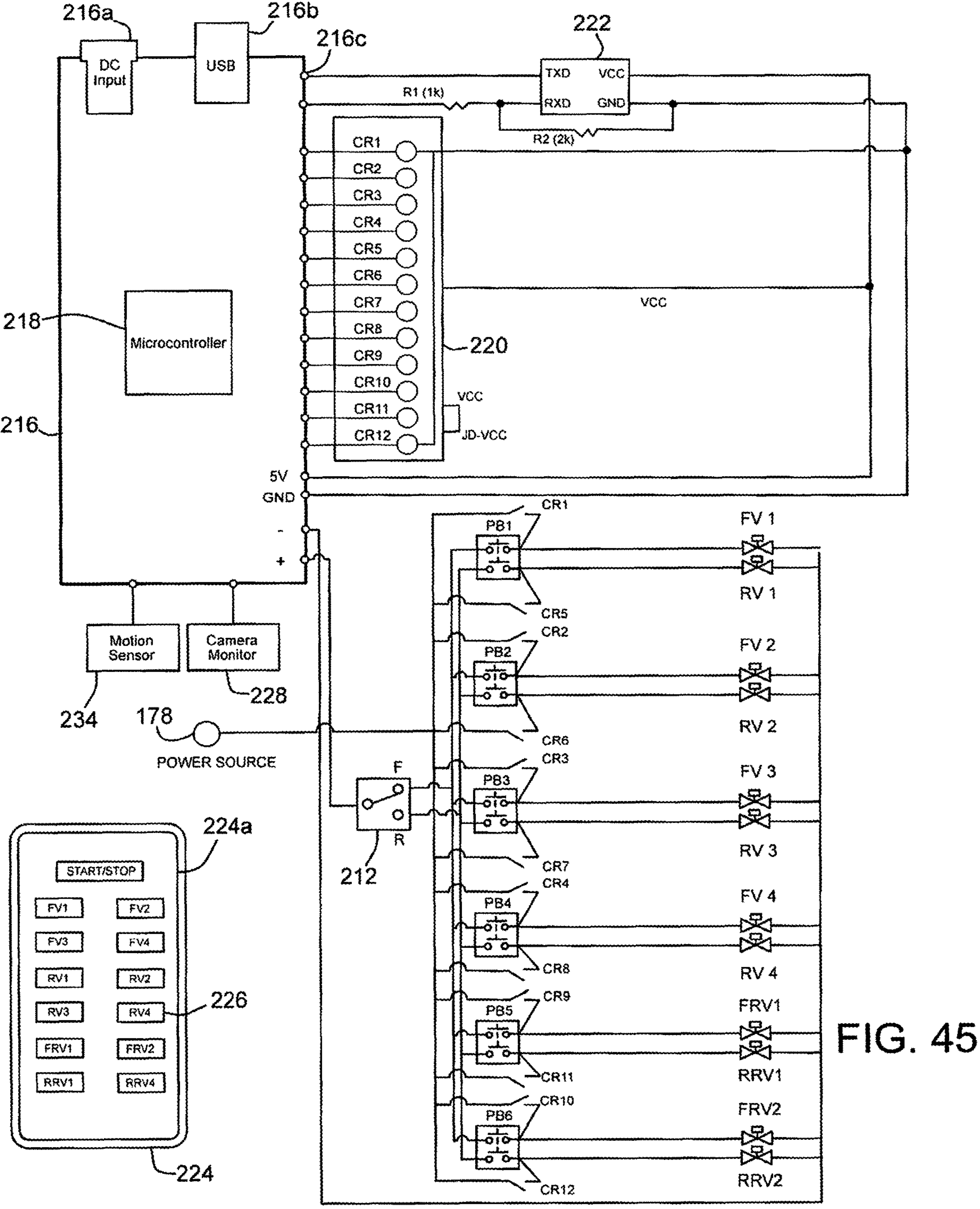
FIG. 45 is a schematic view of the preferred embodiment of the present invention illustrating controller means in the form of a processor board configured with a microcontroller and a communicative device in the form of a smart phone for communicating with the microcontroller to yield manual operation of outlet valves connecting to rail assemblies and air tanks.
Figure 46:
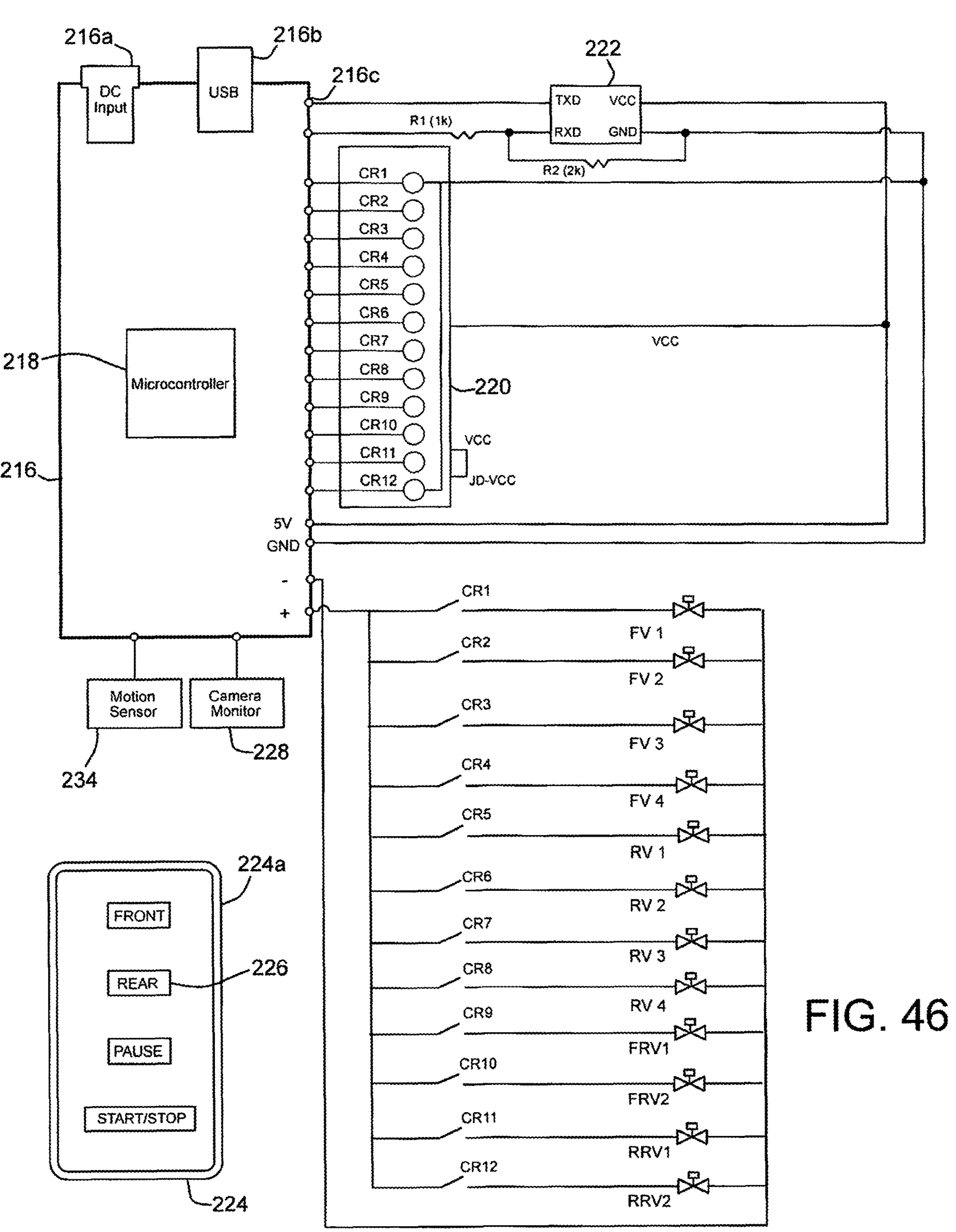
FIG. 46 is a schematic view of the preferred embodiment of the present invention illustrating controller means in the form of a processor board configured with a microcontroller and a communicative device in the form of a smart phone for communicating with the microcontroller to yield automatic, sequential operation of outlet valves connecting to rail assemblies and air tanks.

In a more elaborate configuration, it is conceivable within the scope of the present invention that a second form of controller means may comprise wireless operating means, either used apart from or conjunctively with the first form of controller means, as schematically represented in FIGS. 45 and 46. Wireless operating means in this regard incorporates within its circuitry a processor board 216 comprising a microcontroller 218 integrally configured with onboard memory modules, such as flash memory for receiving and storing a programmable instruction set directed to operational aspects of the zonal cleaning system, static random access memory (SRAM) for generating and manipulating variables while executing the programmable instruction set, and electrically erasable programmable read-only memory (EEPROM) for storing long-term information; a power input 216*a*; a universal serial bus (USB) 216*b* for connectivity to a computer for uploading and flashing the instruction set to flash memory; input/output pins 216*c* suited for connectively to and control of peripheral devices of the type set forth herein; as well as other onboard capabilities commonly associated with processor boards. Processor boards 216 generally recognized as being suited for adaptation to the zonal cleaning system 10 include those that are microcontroller-based or computer-based as respectively manufactured and offered by Arduino® and Raspberry Pi®, as well as other manufacturers known in the art.

In further reference to FIGS. 45 and 46, the circuitry as associated with wireless operating means includes a relay board 220 configured with a preset number of control relays CR1-CR8 individually coupled to select pins 216*c* of the processor board 216 that aptly coincide with each of the output valves 170, generally denoted as front valves FV1-FV4 associated with the front hopper and rear valves RV1-RV4 associated with the rearward hopper. Likewise, in FIG. 45, control relays CR9-CR12 appropriately coincide with each of the refill valves associated with the air tanks 154, generally denoted as front refill valves FRV1 and FRV1 associated with the front dual arrangement of air tanks and rear refill valves RRV1 and RRV2 associated with the rear dual arrangement of air tanks. The relays are of the type configured as normally open (NO) and operate in principle to complete the circuit to feed power to the solenoids of the outlet and refill valves upon activation in accord with the operating parameters of the instruction set. The circuitry of wireless operating means in FIGS. 45 and 46 is further featured with a Bluetooth module 222 electrically coupled to pins capable of receiving (RX) and transmitting (TX) serial data among the microcontroller, Bluetooth module, and a communicative device 224 that may appropriately exist in form as a smartphone or like hand-held devices.

In the instance of using wireless operating means, the communicative device wirelessly connects to and communicates with the Bluetooth module 222 to relay instructions or commands to the microcontroller as might be offered though a software application being configured for and residing on the communicative device. The software application in this regard may be conventionally programmed to generate virtual buttons 226 for visual display on the communicative device's display 224*a* that enables execution of a wide variety of functions or operations associated with the zonal cleaning system 10, including executable commands to start and stop each of the outlet and refills valves, set time intervals for operation of each valve or an arrangement of valves, select and set cyclic and sequential operation of the valves, and so forth. It is conceivable within the scope of the present invention that the aforementioned wireless circuity may employ direct or wireless connectivity of a camera or a monitor 228 to the processor board 216 to advance observation of environmental conditions and cleaning operations during the material unloading process. In this respect, real time video feeds originating from the camera/monitor may be relayed to the communicative device 224 and displayed accordingly thereon by means of the wireless capabilities of the Bluetooth module 222 and its connectively to the processor board.

Wireless operating means may further adapt usage of a Wi-Fi module (not shown) in lieu of or in addition to the Bluetooth module that is communicatively coupled to a processor board 216 to the likes described above for the Bluetooth module to yield equivalent functionality and operation of the zonal cleaning system 10. It is further understood that wireless operating means may alternatively comprise radio frequency (RF) modules consisting of a receiver module (not shown) and transmitter module (not shown) each adaptatively connecting to a dedicated processor board for effecting communications between the transmitter and receiver modules in such manner to control certain aspects of the zonal cleaning system 10 to the likes described above, such as initiating preferential operation of individual valves or a sequence of valves at a predetermined time interval, for example.

Now by way of briefly exemplifying description of the assembly and functionally of the zonal cleaning system 10, notably with respect to the rearward hopper 22 of the trailer, one may appreciably gain further insight into the relatedness and interaction of the operative components discussed thus far that principally fulfill the utilitarian objects of the invention.

Depending on the structural configuration of the hopper, the zonal cleaning system 10 is initially assembled with air tanks housed within the interior compartment of the trailer and supported on available structural members 20*a* existing there within, as generally depicted in FIG. 7. Each air tank 154 is further configured with a refill valve 160 connecting to the main supply line and with a preset number of outlet valves 170 each coinciding with and connecting to a specific rail assembly, wherein each of the rail assemblies may operably exist individually or be joined together for connection to the output port 170*a* of the outlet valve. The main supply line 156 is shown in FIGS. 2 and 2A as being connected to the trailer brake system's air brake supply line 188 to sufficiently supply air to the air tanks based on the output capabilities of the tractor's air compressor via the associated governor, generally being capable of pressurizing the air tanks up to approximately 135 psi. The end and upper rail assemblies with their corresponding nozzles are respectively positioned along the upper portions of the end wall and sidewalls of the rearward hopper 22 with the nozzles being directionally orientated to emit air flow substantially parallel to or angularly inward of about 5-20 degrees toward the incline bottom and sidewall surfaces of the hopper. Comparatively, the sidewall rail assembly is mounted adjacent to and extends alongside the upper rail assembly 14 with each sidewall rail assembly including at least one drop-down segment 54 configured with a nozzle manifold 58.

The nozzle manifold is typically shown in FIG. 15 as comprising at least one circumferential row of bores threadably fitted with nozzles 60 that are directionally oriented in general along planar surfaces and toward corners and crevices formed by the end and side walls adjoining the incline bottom surfaces of the trailer. In the event of transporting material possessing unusual adhering characteristics, such as distiller's dry grains (DDGs) or like material, it may be advantageous to supplement the configured arrangement of the upper and end rail assemblies commonly designated for the hopper with one or more sidewall rail assemblies configured with an angular-bodied nozzle manifold 78 that can offer extended reach inwardly within the hopper or utilize multiple domed nozzles 124 strategically placed and mounted to the planar surfaces of the hopper, such as shown in FIGS. 3, 7 and 8. In the case of using domed nozzles, for example, individual domed nozzles may be positioned relatively about and integrated within the incline bottom surfaces as in FIG. 3 and, in some cases, about the trailer's walls, to aggressively initiate zonal movement of persistent, adhering material for consummate dispensing thereof through the chute 30. Like each of the rail assemblies, the domed nozzle may individually connect to the air tank 154 via a dedicated outlet valve 170 for emphasized operation within the hopper 22, or in the case of employing use of multiple domed nozzles, they maybe conventionally combined with a linking pipe member 230 that includes a common inlet 230*a* for connection to the outlet valve.

Manual and automated operation of the zonal cleaning system is facilitated by controller means, respectively comprising a manual switch panel 204 configured with push buttons 208 and wireless operating means comprising a processor board 216 configured with a microcontroller that adaptively accepts connection of a Bluetooth module 222 and multiple relays (CR1-12) coinciding individually with an outlet valve or a refill valve, as largely depicted in FIGS. 45 and 46.

In furthering configuration of the zonal cleaning system 10 for manual operation, each of the push buttons of the manual switch panel is electrically coupled to an outlet valve 170 or a refill valve that may be connectively associated with the individual air tank 154. In some cases, a junction box (not shown) located in vicinity of each dual arrangement of air tanks 154 may be utilized to facilitate the electrical connections between the push buttons and coinciding valves configured for the air tank.

In manual mode of operation, the selector switch 212 in FIGS. 43 and 44 is appropriately set to R to establish availability of power for effecting manual operation of the outlet valves 170 and refill valves associated with the air tanks located near the rearward hopper 22. Activation of any one push button effects to energize the solenoid of the outlet valve to open and release pressurized air from the air tank and through the connecting rail assembly for distribution into the rearward hopper via the attached arrangement of nozzles for each rail assembly. A predetermined sequence of operation of the outlet valves and associated connecting rail assemblies is preferably executed to augment the zonal cleaning system's capability to initiate movement of the transported material zonally within the rearward hopper for consummate dispensing through the hopper's chute 30. Accordingly, it is desirable to sequentially operate the outlet valves to direct air flow initially through the sidewall rail assembly 18, collectively or individually, followed by the upper rail assembly 14, collectively or individually, and lastly through the end rail assembly 16, collectively or individually. With more difficult material, such as DDG, it is desirable to initiate cleaning operations by activating the push button for the outlet valve connecting to one or more domed nozzles 124 followed by the aforementioned, preferred sequence of operation. As in all cases of manual operation of the zonal cleaning system 10, the rear air tanks 154 must be replenished manually with pressurized air during interim moments of use to further subsequent, sequential operation of the rail assemblies. In this regard, after each instance of activating operation of the outlet valve 170 and its coinciding, connecting rail assembly, the push button assigned to the refill valve must be activated so that the main supply line 156 can deliver to and replenish the recently used air tank with pressurized air to the available extent of air supply means.

In furthering configuration of the zonal cleaning system 10 for automated operation, the microcontroller's memory is loaded with a programmable instruction set directed to executing sequential operation of the zonal cleaning system to the likes set forth above for manual operation, notably with respect to each of the outlet valves and refill valves generally associated with the dual arrangement of air tanks designated for the rearward hopper 22, for example. A communicative device 224 in the form of a smartphone and its indirect connectivity to the microcontroller 218 via the Bluetooth module affords opportunity to interact with virtual buttons 226 appearing on the smartphone's display, such as those that may be generated by a software application residing on the communicative device and linked accordingly to fulfill execution of the instruction set. As shown in FIG. 45, depending on the desired mode of operation, the communicative device may possess virtual buttons assigned to each outlet valve so that one may undertake manual operation of the cleaning system 10 to the likes afforded by the methodology of manually interacting with physical push buttons, as generally described above, where in particular activation of the virtual button would commence operation of the linked outlet valve for a predetermined time interval.

Figure 47:
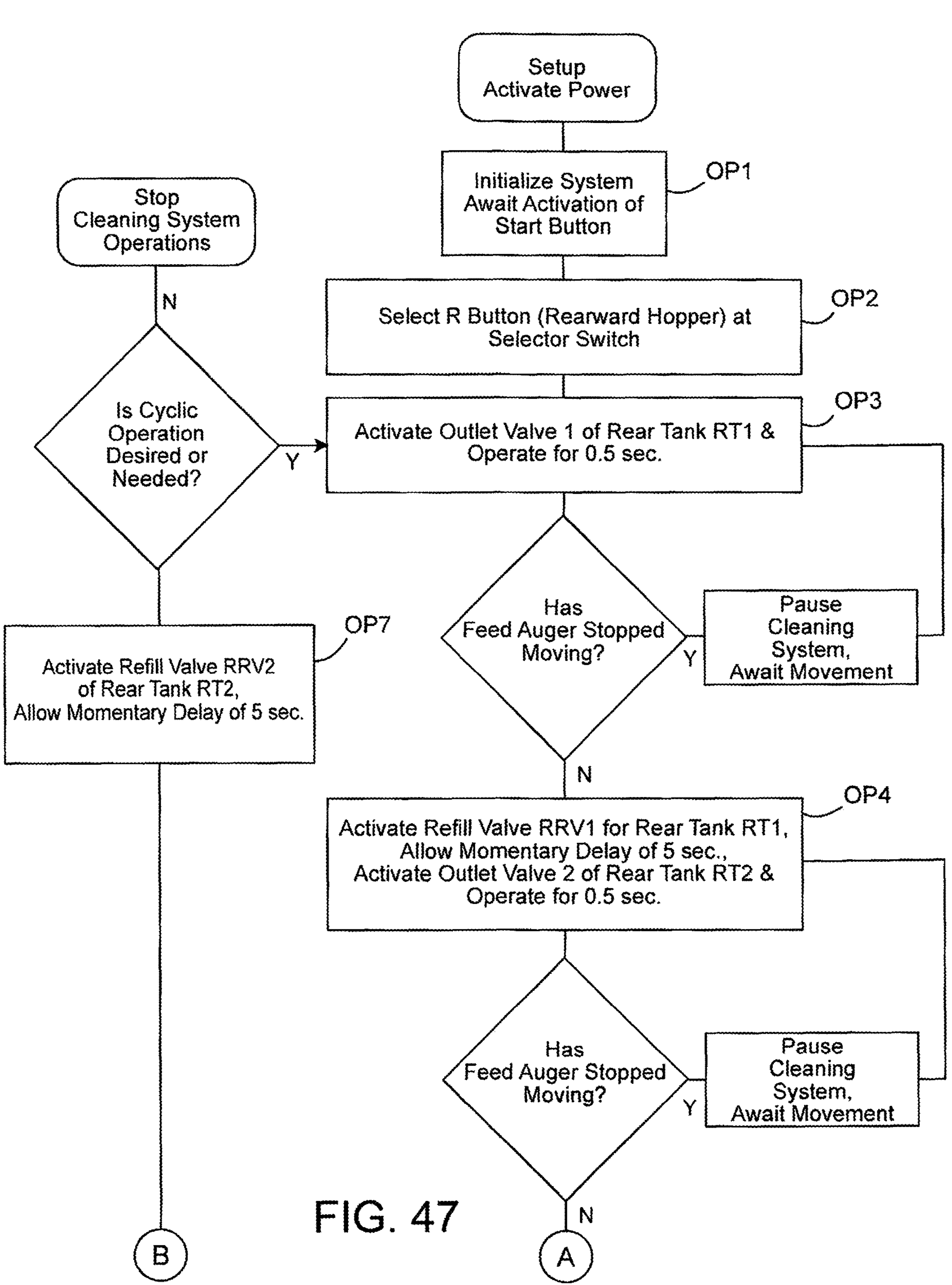
FIG. 47 is a flow diagram of the preferred embodiment of the present invention illustrating preferred, sequential operation of outlet and air refill valves associated with a rear hopper of a dual-hopper trailer.
Figure 48:
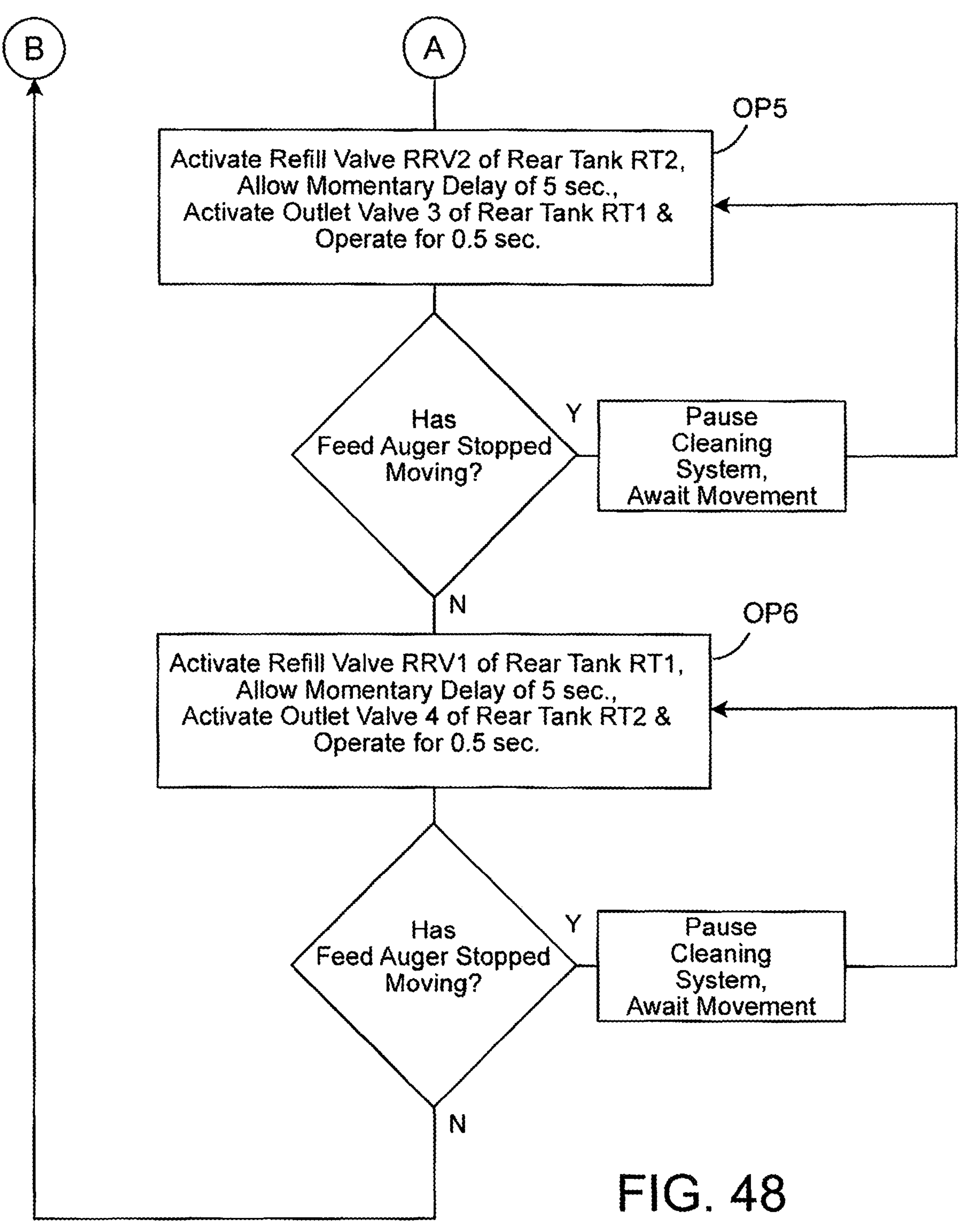
FIG. 48 is a flow diagram of the preferred embodiment of the present invention illustrating continuation of preferred, sequential operation of outlet and air refill valves associated with a rear hopper of a dual-hopper trailer.

Alternatively, as in FIG. 46, the communicative device may include virtual buttons for display thereon, including selector buttons designated Front or Rear respectively for the forward and rearward hoppers, a start button, a pause button, and a stop button, whereby the instruction set comprises commands for automated execution of the referred sequence of operation, each occurring for a predetermined time interval followed by a preset momentary delay. FIGS. 47 and 48, depicts a flow diagram exemplifying and briefly describing the preferred sequence of operation for each of the valves connecting to its respective rail assembly positioned within the rearward hopper for fulfilling zonal cleaning operations there within, as primarily occurring with the automated mode of operation.

At setup, the communicative device is power activated along with the processor board 216 to enable pairing and communication with the microcontroller via the connected Bluetooth module 222. At operational prompt OP1 in FIG. 47, the processor board and system instructions are initialized and awaits activation of the start button virtually appearing on the smartphone's display 224*a*. At operational prompt OP2, selector button R is activated followed by the start button to commence zonal cleaning operations for the rearward hopper. At operational prompt OP3, the first outlet valve attached to rear air tank RT1 and connecting to the leftward side rail assembly is opened for release of pressurized air from RT1 for a predetermined amount of time, preferably being programmed to operate 0.5 seconds to fulfill a quick, forceful burst of air flow into the rearward hopper, along the left sidewall. At operational prompt OP4 in FIG. 47, after a preset momentary delay of five seconds, for example, the rear refill valve RRV1 for RT1 is opened to replenish pressurized air therefor from air supply means, while the second outlet valve attached to rear air tank RT2 and connecting to the rightward side rail assembly is opened for release of pressurized air from RT2 for 0.5 seconds to fulfill a quick, forceful burst of air flow into the rearward hopper, along the right sidewall. At operational prompt OP5 in FIG. 48, after a preset momentary delay of five seconds, the rear refill valve RRV2 for RT2 is opened to replenish pressurized air therefor from air supply means, while the third outlet valve attached to RT1 and connecting to the upper rail assembly is opened for release of pressurized air from RT1 for 0.5 seconds to fulfill a quick, forceful burst of air flow into the hopper, along the upper portion of and downwardly along the left and right sidewalls of the hopper. At operational prompt OP6 in FIG. 48, after a preset momentary delay of five seconds, the refill valve RRV1 for RT1 is opened to replenish pressurized air therefor from air supply means, the fourth outlet valve attached to RT2 and connecting to the end rail assembly is opened for release of pressurized air from RT2 for 0.5 seconds to fulfill a quick, forceful burst of air flow into the hopper, along the end wall and incline bottom surface of the hopper. At operational prompt OP7 in FIG. 47, the refill valve RRV2 for RT2 is opened to replenish pressurized air therefor from air supply means to further cyclic operation of the zonal cleaning system if needed or desired.

At each of the operational prompts OP3-OP6 in FIGS. 47 and 48, conditions are monitored for active movement of a feed auger generally associated with the material unloading station and used to facilitate movement and transport of material from the hopper to an onsite storage unit associated with the material unloading facility. In the event of auger stoppage, is it conceivable during operation that an ample amount of material may backup within the hopper 22 and its associated chute 30 in such manner to adversely impact the operational capabilities of the zonal cleaning system 10. Accordingly, it is desirable to monitor the auger's operation to mitigate adverse consequences in this regard. In application, a motion sensor 234 is communicatively coupled to one of the available pins of the processor board 156 as shown in FIGS. 45 and 46 and actively monitors movement of the unloading feed auger. In the event of sensing non-movement of the auger, the motion sensor will prompt the microcontroller to pause operation of the zonal cleaning system 10 until augur movement is re-established, whereupon the zonal cleaning system will resume sequential operation from the moment of encountering a paused response at any one particular operational prompt, as generally depicted in FIGS. 47 and 48. Since the zonal cleaning system 10 may not always fulfill entire removal of all transported material from the hopper while undergoing sequential cleaning operations, the zonal cleaning system may be programmed to cyclically operate more than one time, whereby the sequence of operation re-starts at OP3 in FIG. 47. If cyclic operation is not needed or desired, the zonal cleaning system is deactivated and shuts down accordingly.

Figure 49:
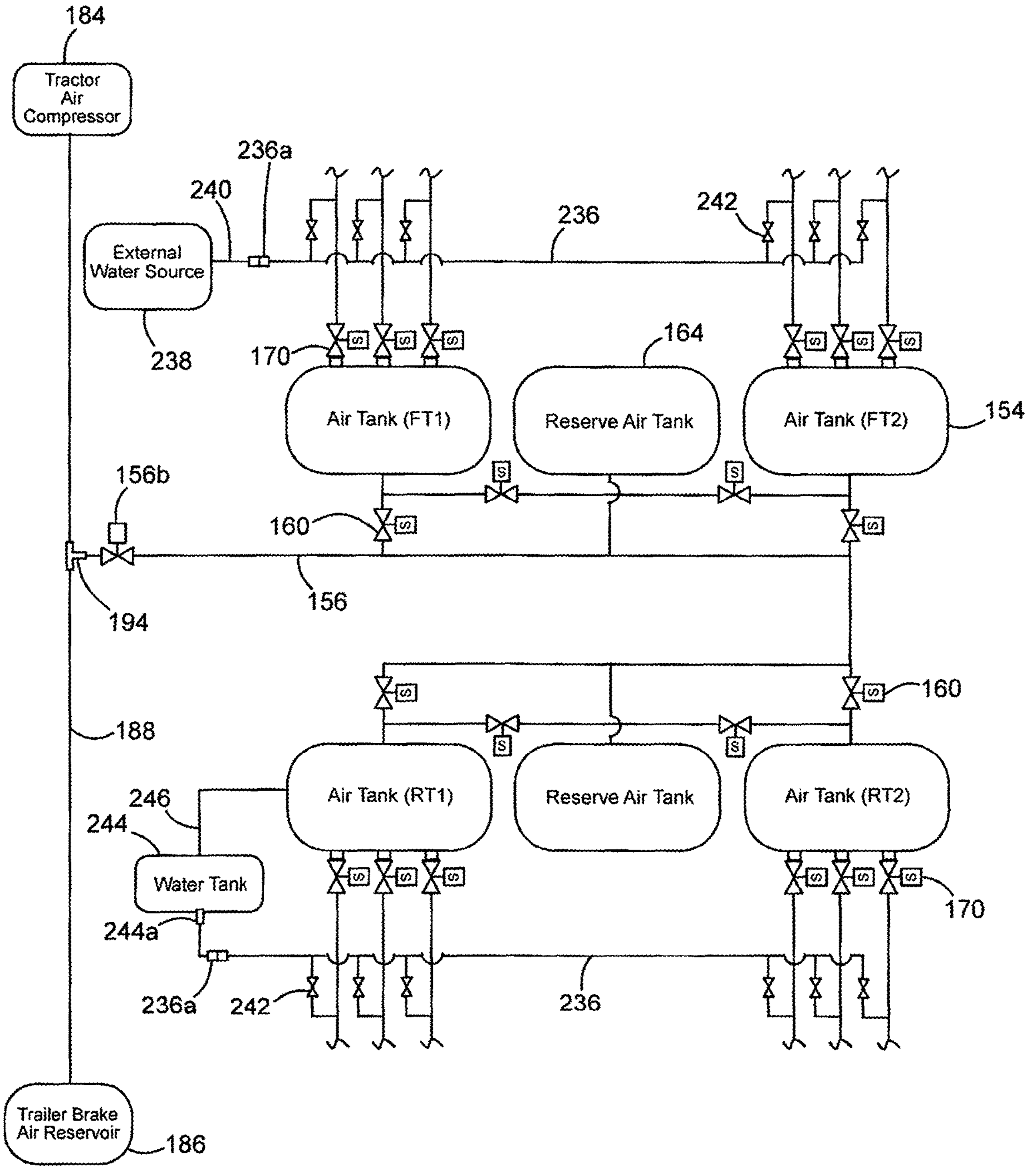
FIG. 49 is a schematic view of the preferred embodiment of the present invention illustrating fluid supply means in the form of an outside water source or alternatively in the form of a water tank each connecting to an injector line to feed liquid to individual rail assemblies.

As further affiliated with the zonal cleaning system 10 as discussed and described thus far, it may be desirable to utilize the infrastructure of each of the rail assemblies to convey with the passing air flow a liquid medium, such as plain water or a mixture of water with a detergent or a surfactant generally of food grade quality, to fulfill enhanced cleaning effectiveness of the hopper 22 that may perhaps extend to mitigating occurrences of cross contamination among differing types of transported material. In this regard, an injector line 236 may be incorporated and connected inline of each of the rail assemblies so as to receive an injectable amount of fluid while the zonal cleaning system 10 sequentially operates in the manner set forth by the instruction set. As illustrated in FIG. 49, an input port 236*a* of the injector line may adaptively connect to fluid supply means, which in simplified form may be a water source 238 existing external to and apart from the tractor-trailer arrangement, possibly being offered at a material unloading station, truck stop, waste disposal site, and other like facilities. In this regard, a hose 240 extending from the external water source may readily connect to the input port to allow pressurized water to enter into and feed each of the rail assemblies, collectively or individually, by way of inline connected control valves 242 for distribution of the air and water mixture interiorly within the confines of the hopper.

In an alternative form of water source means, as further illustrated in FIG. 49, a water tank 244 located and carried onboard the trailer, for example, may be appropriately used in this capacity, whereby an output port 244*a* of the water tank connects to the input port 236*a* of the injector line. An air pressure line 246 extending from one the air tanks 154 may connect to and feed pressurized air into the head space of the water tank to forcefully expel water from the water tank and into the injector line 236, where it can appropriately interact and mix with the outgoing air stream that typically occurs by the sequential operation of the outlet valves 170 of the zonal cleaning system 10.

It is obvious that the components comprising the zonal cleaning system 10 may be fabricated from a variety of materials, providing such selection or use of materials possess the capacity to withstand forces acting thereon throughout its duration of use and limit occurrences of premature failure due to occasional exposure to a moisture-laden environment and contained materials. Accordingly, it is most desirable, and therefore preferred, to construct the zonal cleaning system 10, namely, the upper rail assemblies 14, sidewall rail assemblies 18, end rail assemblies 16, and overhead rail assembly 80 with piping fabricated from aluminum, plastic or an equivalent type of material that meaningfully offers reasonable structural strength for its weight, while limiting the extent by which the components may unacceptably fail due to corrosion. Comparatively, the air tanks 154 may be affordably fabricated from steel and coated with a protective layer of paint or equivalent to guard against corrosion. In some applications where the trailer offers restrictive spatial accommodations for the air tanks, the air tanks may be combined into a baffled air tank wherein separable baffled compartments aptly function to the likes of the individual air tanks associated with the controlled air supply 12.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

The invention claimed is:

1. A zonal cleaning system for a hopper trailer having sidewalls with an upper portion and inclined bottom surfaces converging inwardly toward an open chute, the zonal cleaning system comprising:

a controlled air supply including outlet valves configured to operate sequentially and cyclically for a predetermined amount of time;

one or more upper rail assemblies and mounted adjacent or at the upper portion of the sidewalls, each of the one or more upper rail assemblies fluidly coupled to one of the outlet valves and including nozzles directionally oriented downward alongside and angularly inward toward the sidewalls; and a plurality of domed nozzles wherein each domed nozzle is fluidly coupled to the controlled air supply and configured to extend through an inclined bottom surface of the hopper trailer.

2. The zonal cleaning system of claim 1, further comprising one or more end wall rail assemblies each fluidly coupled to a corresponding one of the outlet valves and having second nozzles directionally oriented to substantially coincide with the incline bottom surfaces.

3. The zonal cleaning system of claim 1, wherein the controlled air supply is in fluid communication with one or more air reservoirs and an air brake supply line extending from an onboard air compressor associated with a tractor-trailer brake system.

4. The zonal cleaning system of claim 1, further comprising a controller operably coupled to the outlet valves to control and regulate air flow through each of the one or more upper rail assemblies and the plurality of domed nozzles via control of the outlet valves.

5. The zonal cleaning system of claim 4, wherein each of the outlet valves includes a normally-closed solenoid valve coupled to an onboard power source and the controller, and wherein each normally-closed solenoid valve is opened sequentially and cyclically for a predetermined amount of time.

6. The zonal cleaning system of claim 1, and further comprising one or more end wall rail assemblies each fluidly coupled to the controlled air supply and having second nozzles directionally oriented to expel fluid on one of the incline bottom surfaces.

7. The zonal cleaning system of claim 1, and further comprising one or more drop-down segments fluidly coupled to a fluid delivery line and extending downward along the sidewalls, each of the drop-down segments including a nozzle manifold having one or more nozzles, wherein activation of the controlled air supply is configured to forcibly expel air sequentially and cyclically through each of the upper rail assemblies and drop-down segments.

8. The zonal cleaning system of claim 1, wherein each domed nozzle is configured to extend through an inclined bottom surface of the hopper trailer.

9. A zonal cleaning system for a hopper trailer for a hopper trailer having sidewalls with an upper portion and inclined bottom surfaces comprising:

an air reservoir;

a controlled air supply in fluid communication the air reservoir;

a plurality of rail assemblies in fluid communication with the controlled air supply, wherein each rail assembly of the plurality of rail assemblies is disposed on the upper portion with nozzles configured to direct air onto a sidewall;

and a plurality of domed nozzles configured to be disposed and arranged in the hopper trailer, wherein each of the plurality of domed nozzles extends through a planar surface of the hopper trailer, and wherein each domed nozzle is fluidly coupled to the controlled air supply and includes a 360-degree dispersion pattern.

10. The zonal cleaning system of claim 9, wherein the controlled air supply includes a plurality of outlet valves and each rail assembly of the plurality of rail assemblies is connected to a corresponding one of the plurality of outlet valves, wherein each outlet valve of the plurality of outlet valves is opened sequentially and cyclically for a predetermined amount of time.

11. The zonal cleaning system of claim 10, wherein each outlet valve of the plurality of outlet valves is connected to a wireless controller and the wireless controller operates the plurality of outlet valves for a predetermined amount of time to allow air to flow from the air reservoir into and through the plurality of rail assemblies.

12. The zonal cleaning system of claim 9, wherein the air reservoir is configured to receive air from an air compressor.

13. The zonal cleaning system of claim 12, wherein the air compressor is an onboard air compressor operably associated with a trailer brake system of a semi-trailer truck.

14. The zonal cleaning system of claim 13, wherein the air reservoir is isolated from the trailer brake system.

15. The zonal cleaning system of claim 12, wherein the plurality of domed nozzles includes three domed nozzles, and wherein the three domed nozzles are oriented to discharge compressed air on different portions of planar surfaces within the hopper trailer.

16. The zonal cleaning system of claim 9, further comprising an injector line connected in-line with each of the plurality of rail assemblies, wherein the injector line is connected to a fluid supply to allow pressurized fluid to enter into and feed each of the rail assemblies.

17. The zonal cleaning system of claim 9, further comprising a box manifold connected to the air reservoir and including a plurality of outlet valves, wherein each outlet valve of the plurality of outlet valves is connected to a fluid delivery line of corresponding one of the plurality of rail assemblies.

18. The zonal cleaning system of claim 17, wherein each outlet valve of the plurality of outlet valves on the box manifold includes a normally-closed solenoid valve electrically coupled to an onboard power source and a controller, and wherein each normally-closed solenoid valve is opened sequentially and cyclically for a predetermined amount of time to allow air flow through the normally-closed solenoid valve.

19. The zonal cleaning system of claim 9, and further comprising at least some nozzles are positioned and configured to periodically expel air along an overhead tarp of the hopper trailer to remove material from the overhead tarp.

20. The zonal cleaning system of claim 9, wherein the rail assemblies include a fluid delivery line fluidly coupled to the controlled air supply and a drop-down segment is fluidly coupled to each fluid delivery line and configured to extend into the hopper trailer along a wall of the hopper trailer.

21. The zonal cleaning system of claim 20, further comprising a nozzle manifold operably coupled to the drop-down segment, wherein the nozzle manifold includes at least two nozzles positioned and arranged to expel air along the wall of the hopper trailer.

* * * * *